United States Patent
Lee et al.

(10) Patent No.: US 8,467,468 B2
(45) Date of Patent: Jun. 18, 2013

(54) TRANSMITTING AND RECEIVING APPARATUS HAVING PLURAL ANTENNA IN MULTI-USER ENVIRONMENTS AND METHOD THEREOF

(75) Inventors: Kwangbok Lee, Seoul (KR); Byongok Lee, Bucheon-si (KR); Illsoo Sohn, Seoul (KR); Huiwon Je, Gwacheon-si (KR)

(73) Assignee: SNU R&DB Foundation, Seoul (KR)

( * ) Notice: Subject to any disclaimer, the term of this patent is extended or adjusted under 35 U.S.C. 154(b) by 610 days.

(21) Appl. No.: 12/676,728

(22) PCT Filed: Jul. 18, 2008

(86) PCT No.: PCT/KR2008/004209
§ 371 (c)(1), (2), (4) Date: Mar. 5, 2010

(87) PCT Pub. No.: WO2009/031757
PCT Pub. Date: Mar. 12, 2009

(65) Prior Publication Data
US 2010/0232534 A1 Sep. 16, 2010

(30) Foreign Application Priority Data
Sep. 5, 2007 (KR) .......................... 10-2007-0090064

(51) Int. Cl.
*H04B 7/02* (2006.01)
*H04L 1/02* (2006.01)

(52) U.S. Cl.
USPC ........................................... 375/267

(58) Field of Classification Search
USPC ................. 375/135, 228, 260, 267, 299, 346, 375/347
See application file for complete search history.

(56) References Cited

U.S. PATENT DOCUMENTS

| | | | |
|---|---|---|---|
| 2004/0081121 A1* | 4/2004 | Xu | 370/329 |
| 2006/0083210 A1* | 4/2006 | Li et al. | 370/343 |
| 2006/0121946 A1* | 6/2006 | Walton et al. | 455/561 |
| 2007/0135125 A1* | 6/2007 | Kim et al. | 455/436 |
| 2008/0005219 A1* | 1/2008 | Nabar et al. | 709/201 |
| 2008/0117997 A1* | 5/2008 | Maltsev et al. | 375/267 |
| 2008/0239938 A1* | 10/2008 | Jalloul et al. | 370/201 |
| 2009/0316675 A1* | 12/2009 | Malladi et al. | 370/343 |

FOREIGN PATENT DOCUMENTS

| | | |
|---|---|---|
| KR | 10-2006-0119143 A | 11/2006 |
| WO | WO 2006/020434 A2 | 2/2006 |

* cited by examiner

*Primary Examiner* — Chieh M Fan
*Assistant Examiner* — Syed Haider
(74) *Attorney, Agent, or Firm* — Dickstein Shapiro LLP

(57) ABSTRACT

The present invention provides a radio transmitting and receiving apparatus having multiple antennas that can decrease an influence due to interference between cells that exists in a multi-cell environment, by using a transmission method that not only considers performance of a corresponding cell but also an influence due to interference on adjacent cells and an influence due to interference from the adjacent cells in a multi-user and multi-cell environment, effectively use limited radio resources, and increase a data rate of a radio communication system, and a method thereof.

15 Claims, 10 Drawing Sheets

TRANSMITTING AND RECEIVING APPARATUS HAVING PLURAL ANTENNA IN MULTI-USER ENVIRONMENTS AND METHOD THEREOF

TECHNICAL FIELD

The present invention relates to a radio transmitting and receiving apparatus that has a plurality of antennas in consideration of interference between cells in a multi-user environment and a method thereof. More particularly, the present invention relates to a radio transmitting and receiving apparatus having a plurality of antennas that can improve performance of the entire system in consideration of interference due to and affecting cells adjacent to a cell to which the radio transmitting and receiving apparatus belongs as well as performance of the cell to which the radio transmitting and receiving apparatus belongs, when implementing a transmission method using the plurality of antennas, and a method thereof.

BACKGROUND ART

A multiple-input multiple-output (MIMO) technology increases a data rate and reliability of a radio communication system by installing a plurality of antennas in a transmitting terminal and a receiving terminal. However, studies on almost all of the MIMO technologies in the related art have a limitation in that an influence due to interference between adjacent cells in a multi-cell environment as an actual radio communication environment is not considered, because only a single cell environment is considered.

In a radio communication system that is based on a multi-cell environment, it is very important to resolve the problem, such as interference between adjacent cells. In particular, since an influence due to interference between the cells increases while a frequency reutilization rate between cells increases, the interference is the main cause for obstruction such that a high-speed radio data rate cannot be achieved. The MIMO technology has attracted attention as a means for resolving the problem such as interference between the cells, but studies that actively use multiple antennas to solve the problem are at an initial stage.

Conventional studies that are related to a MIMO technology in a multi-cell environment are as follow. Kang Ji-Woong, Je Hi-won, and Lee Kwang-Bok suggested a transmit antenna selection method in consideration of interference between adjacent cells in a multi-cell environment (J. W. Kang, H. W. Je, and K. B. Lee, "Transmit Antennas Subset Selection for Downlink MIMO Systems", in Proc. IEEE International Conference on Communications 2007 (ICC2007), June 2007)). Blum proved that an optimal transmission method using multiple antennas is dependent on the type of an influence due to interference between adjacent cells, on the assumption that a transmitting terminal does not know channel information (R. S. Blum, "MIMO Capacity with Interference", IEEE Journal on Selected Areas in Communications. Vol. 21, no. 5, pp. 793 to 801, June 2003). Ye suggested a technology that determines a transmission method of multiple antennas in consideration of an influence due to interference between adjacent cells in a multi-cell environment (S. Ye, and R. S. Blum, "Optimized Signaling for MIMO Interference Systems with Feedback", IEEE Transactions on Signal Processing, vol. 51, no. 11, pp. 2848 to 2939, November 2003). However, in order to use the technology that was suggested by Ye, each of the transmitting terminals should know the channel statuses of all links on a system including the transmission methods that are used by transmitting terminals in other cells. Therefore, it is difficult for this technology to be actually applied to the system. In brief, the conventional studies that are related to the MIMO technologies in the multi-cell environment are still at an initial stage, and in particular, studies that are related to a multi-user disclosed in the present invention is insufficient.

DISCLOSURE OF INVENTION

Technical Problem

The present invention has been suggested to solve the above-described problems, and it is an object of the present invention to provide a radio transmitting and receiving apparatus having a plurality of antennas that can be actually used in a communication system by allowing each transmitting terminal to independently determine a transmission method in a multi-user and multi-cell environment using the information which can be locally available at each transmitting terminal, and a radio signal transmission method.

It is another object of the present invention to provide a radio transmitting and receiving apparatus and a radio signal transmission method that can greatly improve performance and a data rate of the entire system by determining transmission beamforming and a user combination in consideration of an influence due to interference between adjacent cells in a multi-cell environment.

Technical Solution

According to a first embodiment of the present invention, there is provided a radio transmitting and receiving apparatus that has a plurality of antennas used for communication in a multi-user and multi-cell environment. The radio transmitting and receiving apparatus includes a channel information estimating unit that uses a signal received from a first base station of a cell to which the radio transmitting and receiving apparatus belongs to estimate desired channel information between the radio transmitting and receiving apparatus and the first base station, and uses a signal received from a second base station of a cell adjacent to the cell to which the radio transmitting and receiving apparatus belongs to estimate interference channel information, which indicates a degree of interference by which the second base station is affected due to a transmission operation of the radio transmitting and receiving apparatus; and a transmission method implementing unit that implements a transmission method of a radio signal to be transmitted, on the basis of the estimated desired channel information and interference channel information.

According to a second embodiment of the present invention, there is provided a radio transmitting and receiving apparatus that has a plurality of antennas used for communication in a multi-user and multi-cell environment. The radio transmitting and receiving apparatus includes a channel information estimating unit that uses a signal received from a first terminal of a cell to which the radio transmitting and receiving apparatus belongs to estimate desired channel information between the radio transmitting and receiving apparatus and the first terminal, and uses a signal received from a second terminal of a cell adjacent to the cell to which the radio transmitting and receiving apparatus belongs to estimate interference channel information, which indicates a degree of interference by which the second terminal is affected due to a transmission operation of the radio transmitting and receiving apparatus; and a transmission method implementing unit that implements a transmission method of a radio signal to be transmitted, on the basis of the estimated desired channel information and interference channel information.

According to a third embodiment of the present invention, there is provided a radio signal transmission method that transmits a radio signal using a radio transmitting and receiving apparatus that has a plurality of antennas used for communication in a multi-user and multi-cell environment. The radio signal transmission method includes a first step of using a signal received from a first base station of a cell to which the radio transmitting and receiving apparatus belongs to estimate desired channel information between the radio transmitting and receiving apparatus and the first base station; a second step of using a signal received from a second base station of a cell adjacent to the cell to which the radio transmitting and receiving apparatus belongs to estimate interference channel information, which indicates a degree of interference by which the second base station is affected due to a transmission operation of the radio transmitting and receiving apparatus; and a third step of implementing a transmission method of a radio signal to be transmitted, on the basis of the estimated desired channel information and interference channel information.

According to a fourth embodiment of the present invention, there is provided a radio signal transmission method that transmits a radio signal using a radio transmitting and receiving apparatus that has a plurality of antennas used for communication in a multi-user and multi-cell environment. The radio signal transmission method includes a first step of using a signal received from a first terminal of a cell to which the radio transmitting and receiving apparatus belongs to estimate desired channel information, which indicates a degree of interference by which the first terminal is affected due to a transmission operation of the radio transmitting and receiving apparatus; a second step of using a signal received from a second terminal of a cell adjacent to the cell to which the radio transmitting and receiving apparatus belongs to estimate interference channel information, which indicates a degree of interference by which the second terminal is affected due to a transmission operation of the radio transmitting and receiving apparatus; and a third step of implementing a transmission method of a radio signal to be transmitted, on the basis of the estimated desired channel information and interference channel information.

According to a fifth embodiment of the present invention, there is provided a radio transmitting and receiving apparatus that has a plurality of antennas used for communication in a multi-user and multi-cell environment. The radio transmitting and receiving apparatus includes a channel information estimating unit that uses a signal received from a first base station of a cell to which the radio transmitting and receiving apparatus belongs to estimate desired channel information between the radio transmitting and receiving apparatus and the first base station, and uses a signal received from a second base station of a cell adjacent to the cell to which the radio transmitting and receiving apparatus belongs to estimate interference channel information, which indicates a degree of interference by which the second base station is affected due to a transmission operation of the radio transmitting and receiving apparatus; a feedback information receiving unit that receives receiving terminal interference information, which indicates interference information that the first base station receives from terminals of adjacent cells, from the first base station; and a transmission method implementing unit that implements a transmission method of a radio signal to be transmitted, on the basis of the estimated desired channel information and interference channel information and the receiving terminal interference information.

According to a sixth embodiment of the present invention, there is provided a radio transmitting and receiving apparatus that has a plurality of antennas used for communication in a multi-user and multi-cell environment. The radio transmitting and receiving apparatus includes a channel information estimating unit that uses a signal received from a first terminal of a cell to which the radio transmitting and receiving apparatus belongs to estimate desired channel information between the radio transmitting and receiving apparatus and the first terminal, and uses a signal received from a second terminal of a cell adjacent to the cell to which the radio transmitting and receiving apparatus belongs to estimate interference channel information, which indicates a degree of interference by which the second terminal is affected due to a transmission operation of the radio transmitting and receiving apparatus; a feedback information receiving unit that receives receiving terminal interference information, which indicates interference information that the first terminal receives from base stations of adjacent cells, from the first terminal; and a transmission method implementing unit that implements a transmission method of a radio signal to be transmitted, on the basis of the estimated desired channel information and interference channel information and the receiving terminal interference information.

According to a seventh embodiment of the present invention, there is provided a radio signal transmission method that transmits a radio signal using a radio transmitting and receiving apparatus that has a plurality of antennas used for communication in a multi-user and multi-cell environment. The radio signal transmission method includes a first step of using a signal received from a first base station of a cell to which the radio transmitting and receiving apparatus belongs to estimate desired channel information between the radio transmitting and receiving apparatus and the first base station; a second step of using a signal received from a second base station of a cell adjacent to the cell to which the radio transmitting and receiving apparatus belongs to estimate interference channel information, which indicates a degree of interference by which the second base station is affected due to a transmission operation of the radio transmitting and receiving apparatus; a third step of receiving receiving terminal interference information that is estimated by a base station of the cell to which the radio transmitting and receiving apparatus belongs; and a fourth step of implementing a transmission method of a radio signal to be transmitted, on the basis of the estimated desired channel information and interference channel information and the receiving terminal interference information.

According to an eighth embodiment of the present invention, there is provided a radio signal transmission method that transmits a radio signal using a radio transmitting and receiving apparatus that has a plurality of antennas used for communication in a multi-user and multi-cell environment. The radio signal transmission method includes a first step of using a signal received from a first terminal of a cell to which the radio transmitting and receiving apparatus belongs to estimate desired channel information between the radio transmitting and receiving apparatus and the first terminal; a second step of using a signal received from a second terminal of a cell adjacent to the cell to which the radio transmitting and receiving apparatus belongs to estimate interference channel information, which indicates a degree of interference by which the second terminal is affected due to a transmission operation of the radio transmitting and receiving apparatus; a third step of receiving receiving terminal interference information that is estimated by a terminal of the cell to which the radio transmitting and receiving apparatus belongs; and a fourth step of implementing a transmission method of a radio signal to be transmitted, on the basis of the estimated desired channel information and interference channel information and the receiving terminal interference information.

According to a ninth embodiment of the present invention, there is provided a radio transmitting and receiving apparatus that has a plurality of antennas used for communication in a multi-user and multi-cell environment. The radio transmitting and receiving apparatus includes a channel information estimating unit that uses a signal received from a first base station of a cell to which the radio transmitting and receiving apparatus belongs to estimate desired channel information between the radio transmitting and receiving apparatus and the first base station, and uses a signal received from a second base station of a cell adjacent to the cell to which the radio transmitting and receiving apparatus belongs to estimate interference channel information, which indicates a degree of interference by which the second base station is affected due to a transmission operation of the radio transmitting and receiving apparatus; a transmission beamforming vector calculating unit that calculates a transmission beamforming vector, on the basis of the estimated desired channel information and interference channel information; a feedback information calculating unit that calculates information needed when the first base station determines a user combination, on the basis of the calculated transmission beamforming vector and the estimated desired channel information; a feedback information transmitting unit that receives the information calculated by the feedback information calculating unit and transmits the information to the first base station; and a feedback information receiving unit that receives information on the user combination determined by the first base station.

According to a tenth embodiment of the present invention, there is provided a radio transmitting and receiving apparatus that has a plurality of antennas used for communication in a multi-user and multi-cell environment. The radio transmitting and receiving apparatus includes a channel information estimating unit that uses a signal received from a first terminal of a cell to which the radio transmitting and receiving apparatus belongs to estimate desired channel information between the radio transmitting and receiving apparatus and the first terminal; a feedback information receiving unit that receives information, which is needed to determine a user combination, from the first terminal; a user combination determining unit that receives the desired channel information and the information needed to determine the user combination and determines the user combination on the basis of the received information; and a feedback information transmitting unit that receives the user combination determined by the user combination determining unit and transmits the user combination to the first terminal.

According to an eleventh embodiment of the present invention, there is provided a radio transmitting and receiving apparatus that has a plurality of antennas used for communication in a multi-user and multi-cell environment. The radio transmitting and receiving apparatus includes a channel information estimating unit that uses a signal received from a first terminal of a cell to which the radio transmitting and receiving apparatus belongs to estimate desired channel information between the radio transmitting and receiving apparatus and the first terminal, and uses a signal received from a second terminal of a cell adjacent to the cell to which the radio transmitting and receiving apparatus belongs to estimate interference channel information, which indicates a degree of interference by which the second terminal is affected due to a transmission operation of the radio transmitting and receiving apparatus; a transmission beamforming vector calculating unit that calculates a transmission beamforming vector on the basis of the desired channel information and the interference channel information; and a user combination determining unit that determines a user combination on the basis of the estimated desired channel information and interference channel information.

According to a twelfth embodiment of the present invention, there is provided a radio signal transmission method in which a radio transmitting and receiving apparatus having a plurality of antennas used for communication in a multi-user and multi-cell environment transmits a radio signal to a first base station of a corresponding cell. The radio signal transmission method includes a first step of allowing the radio transmitting and receiving apparatus to use a signal received from the first base station and a second base station of an adjacent cell during a downlink so as to estimate desired channel information and interference channel information; a second step of allowing the radio transmitting and receiving apparatus to calculate a transmission beamforming vector on the basis of the desired channel information and the interference channel information; a third step of allowing the radio transmitting and receiving apparatus to calculate information needed to determine a user combination on the basis of the interference channel information and the transmission beamforming vector and transmit the information to the first base station; and a fourth step of allowing the radio transmitting and receiving apparatus to implement a transmission method on the basis of information that is related to the user combination transmitted from the first base station.

According to a thirteenth embodiment of the present invention, there is provided a radio signal transmission method in which a radio transmitting and receiving apparatus having a plurality of antennas used for communication in a multi-user and multi-cell environment transmits a radio signal to a first terminal of a corresponding cell. The radio signal transmission method includes a first step of allowing the radio transmitting and receiving apparatus to use a signal received from the first terminal and a second terminal of an adjacent cell during an uplink so as to estimate desired channel information and interference channel information; a second step of allowing the radio transmitting and receiving apparatus to calculate a transmission beamforming vector and determine a user combination in consideration of performance of a cell to which the radio transmitting and receiving apparatus belongs and an influence due to interference on the second terminal from the radio transmitting and receiving apparatus, on the basis of the desired channel information and the interference channel information; and a third step of allowing the radio transmitting and receiving apparatus to implement a transmission method on the basis of the calculated transmission beamforming vector and the determined user combination.

Advantageous Effects

According to the present invention, the following effects can be achieved.

First, a method is suggested, in which a transmitting terminal obtains interference channel information between receiving terminals of adjacent cells in a multi-user and multi-cell environment. Therefore, a transmission method can be implemented in consideration of an influence due to interference on the adjacent cells when a signal is transmitted.

Second, the present invention uses a transmission method that not only considers performance of a corresponding cell but also an influence due to interference on adjacent cells and an influence due to interference from the adjacent cells in a multi-user and multi-cell environment. As a result, it is possible to decrease an influence due to interference between cells that exists in a multi-cell environment. Therefore, limited radio resources can be effectively used and a data rate of a radio communication system can be increased.

Third, various transmission methods, such as a transmission beamforming method, a multi-stream transmission method, and a multi-user transmission method, are suggested. Therefore, the various transmission methods can be applied to various communication systems in a multi-cell environment, and performance of the communication systems can be improved.

Fourth, a method that determines a transmission beamforming vector and a user combination in consideration of performance of a corresponding cell and adjacent cells is suggested. If the number of transmitting antennas increases, excellent performance can be obtained, and performance and a data rate of the entire system can be increased.

BEST MODE FOR CARRYING OUT THE INVENTION

The present invention will now be described more fully with reference to the accompanying drawings. However, in describing the present invention, when the specific description of the related known technology departs from the scope of the present invention, the detailed description of the corresponding known technology will be omitted. Rather, these embodiments are provided so that this disclosure will be thorough and complete and will fully convey the concept of the invention to those skilled in the art. In addition, in each drawing, the size of each layer and region and relative sizes can be exaggerated for clarification.

Hereinafter, a radio transmitting and receiving apparatus that has a plurality of antennas used in a multi-user and multi-cell environment in accordance with the present invention and a method thereof will be described in detail with reference to the accompanying drawings.

For MIMO systems, a base station can use space domains to communicate with a plurality of terminals at the same time. That is, the base station can simultaneously transmit different data streams to the plurality of terminals, respectively, and in contrast, the plurality of terminals can simultaneously transmit data streams to the base station. This is defined as a multi-user transmission method in embodiments of the present invention.

Hereinafter, a multi-user transmission method that not only considers performance of a corresponding cell but also an influence due to interference on adjacent cells in a multi-cell environment will be first described for each case of uplink and downlink.

(Multi-User Transmission Method that not only Considers Performance of a Corresponding Cell but also an Influence Due to Interference on Adjacent Cells During an Uplink)

Figure 1:
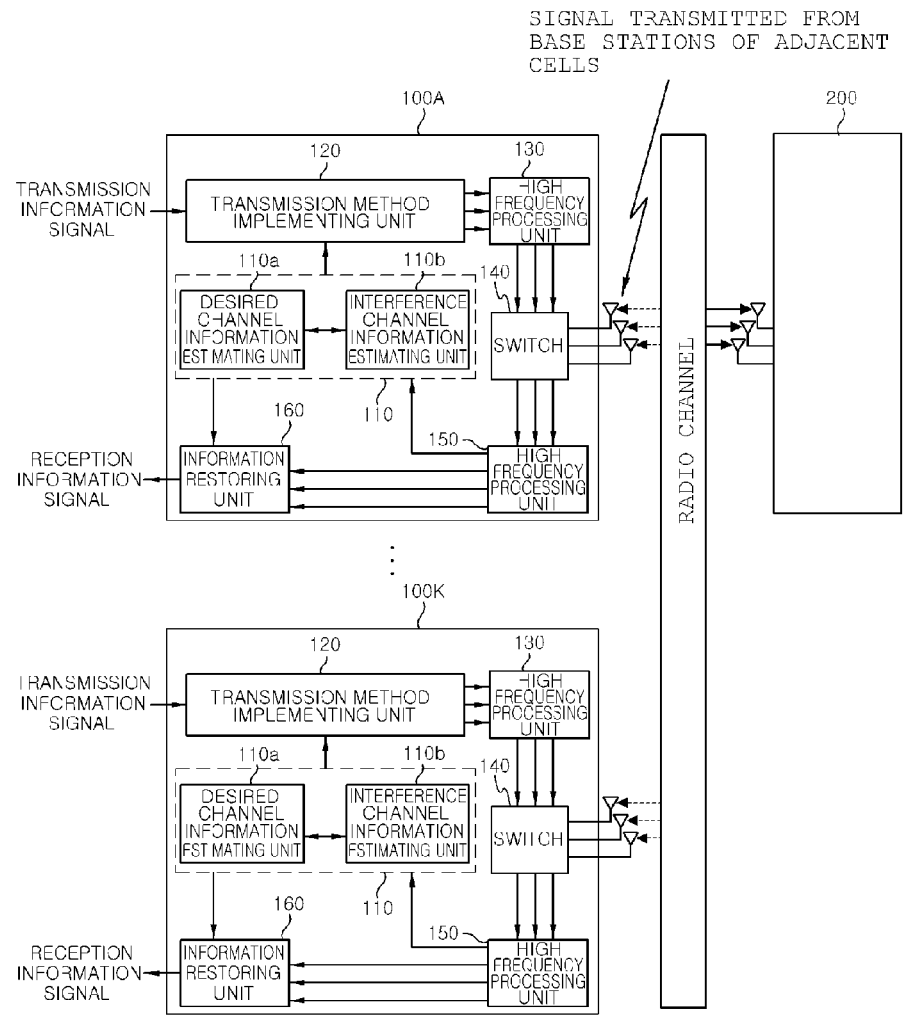
FIG. 1 is a block diagram illustrating a system in which K terminals, which have a plurality of antennas used for communication in a multi-user and multi-cell environment, transmit a data stream to a base station in consideration of not only performance of a corresponding cell but also an influence due to interference on adjacent cells.

FIG. 1 is a block diagram illustrating a system in which K terminals, which have a plurality of antennas used for communication in a multi-cell environment, transmit data to a base station in consideration of not only performance of a corresponding cell but also an influence due to interference on adjacent cells. FIG. 1 shows only one cell that includes a plurality of terminals 100A to 100K and one base station 200 to allow the present invention to be clearly understood. Actually, a plurality of cells exist, and the plurality of terminals 100A to 100K and one base station 200 exist in each of the cells, as shown in FIG. 1. Since the terminals 100A to 100K all have the same configuration, only one terminal 100A will be described in order to avoid a repetitive description.

The terminal 100A includes a channel information estimating unit 110, a transmission method implementing unit 120, high frequency processing units 130 and 150, a switch 140, and an information restoring unit 160.

The high frequency processing unit 130 converts a high frequency signal transmitted from the transmission method implementing unit 120 into a base band signal and transmits the base band signal to the switch 140.

The switch 140 receives high frequency signals from base stations of adjacent cells through multiple antennas and transmits the received high frequency signals to the high frequency processing unit 150. The switch 140 receives the base band signal that is transmitted by the high frequency processing unit 130 and transmits the base band signal to the base station 200 through multiple antennas.

The high frequency processing unit 150 converts the high frequency signal transmitted from the switch 140 into a base band signal and transmits the base band signal to the information restoring unit 160.

The information restoring unit 160 receives the base band signal from the high frequency processing unit 150 and restores the received base band signal. At this time, the information restoring unit 160 restores the received base band signal in consideration of interference channel information and desired channel information estimated by the channel information estimating unit 110.

The channel information estimating unit 110 includes a desired channel information estimating unit 110a and an interference channel information estimating unit 110b.

On the basis of a signal that is received for communication with the base station 200 of a cell that the terminal 110A belongs, the desired channel information estimating unit 110a uses channel reciprocity to estimate desired channel information between the terminal 100A and the base station 200. The estimation of desired channel information can be easily achieved by the related art (C. L. Miller, D. P. Taylor, and P. T. Gough, "Estimation of Co-channel Signals with Linear Complexity", IEEE Trans. Commun., vol. 49, no. 11, pp. 1997-2005, November 2001). The channel reciprocity means that a channel response from a transmitting terminal to a receiving terminal in a radio channel environment is the same as a channel response from the receiving terminal to the transmitting terminal therein, and may be effectively used in a TDD system where the channel reciprocity exists.

On the basis of signals that are received from base stations of cells adjacent to a corresponding cell, the interference channel information estimating unit 110b uses channel reciprocity to estimate interference channel information that indicates a degree of interference by which the base stations of the adjacent cells are affected due to a transmission operation of the terminal 100A of the corresponding cell. In the related art, channel reciprocity is mainly used to know desired channel information between a transmitting terminal and a receiving terminal of a corresponding cell. However, in the present invention, the channel reciprocity is used to know interference channel information between a transmitting terminal of a corresponding cell and a receiving terminal of an adjacent cell as well as the desired channel information.

An estimation method where the interference channel information estimating unit 110b estimates interference channel information will be described in detail below. In the below description, the estimation method is only exemplary and the present invention is not limited thereto. That is, various estimation methods may be used.

For example, a MIMO TDD (Time Division Duplex) system in a multi-cell environment is considered. Further, when it is assumed that the number of cells is M, Nu antennas exist in each terminal, and Nb antennas exist in each base station, a signal that a terminal of an m-th cell receives during a downlink can be represented by the following Math Figure 1.

MathFigure 1

$$y_m^D = H_{m,m}^D x_m^D + \sum_{n=1,n \neq m}^{M} H_{m,n}^D x_n^D + n_m^D \qquad [\text{Math. 1}]$$

$H_{m,n}^D$ denotes a downlink channel response matrix (Nu×Nb) between a base station of an n-th cell and a terminal of an m-th cell, $X_m^D$ denotes a downlink signal vector (Nb×1) that is transmitted from a base station of the m-th cell, and $n_m^D$ denotes a noise vector (Nu×1) in the terminal of the m-th cell during the downlink. Like this, a signal that the base station of the m-th cell receives during an uplink can be represented by the following Math Figure 2.

MathFigure 2

$$y_m^U = H_{m,m}^U x_m^U + \sum_{n=1,n \neq m}^{M} H_{m,n}^U x_n^U + n_m^U \qquad [\text{Math. 2}]$$

Figure 3:
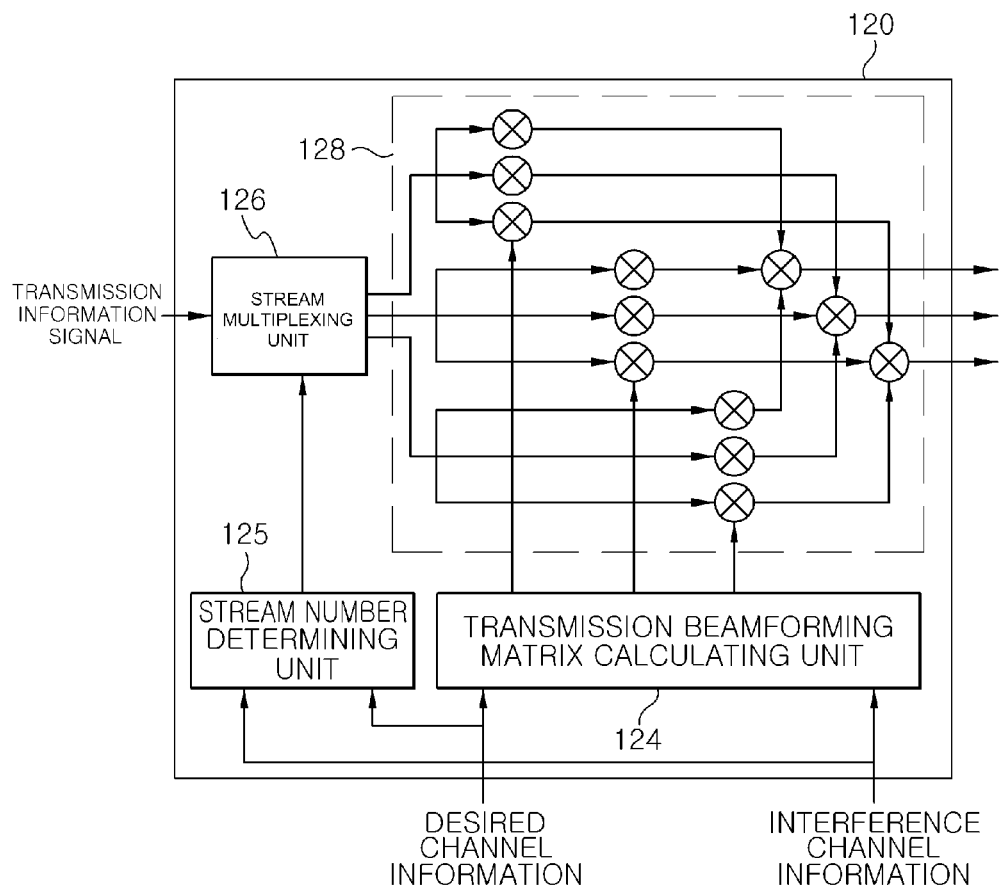
FIG. 3 is a block diagram illustrating a transmission method implementing unit when using a multi-stream transmission method as a transmission method that not only considers performance of a corresponding cell but also an influence due to interference on adjacent cells.

$H_{m,n}^U$ denotes an uplink channel response matrix (Nb×Nu) between the terminal of the n-th cell and the base station of the m-th cell, $X_m^U$ is an uplink signal vector (Nu×1) that is transmitted from the terminal of the m-th cell, and $n_m^U$ denotes a noise vector (Nu×1) in the base station of the m-th cell during an uplink. In this case, a relationship that is represented by the following Math Figure 3 is formed by the channel reciprocity.

MathFigure 3

$$H_{m,n}^U = (H_{n,m}^D)^H \qquad [\text{Math. 3}]$$

In this case, an upper subscript $H$ denotes Hermitian of a matrix. If using Math Figure 3, it is possible to obtain the interference channel information that is a channel response between a terminal and base stations of cells adjacent to a cell to which the terminal belongs on the basis of interference signals that the terminal receive from base stations of cells adjacent to a cell to which the terminal belongs during a downlink.

A process of obtaining interference channel information from the received signals can be achieved by two methods. One is to estimate desired channel information from a received predetermined pilot signal and subtract an received signal by the estimated desired signal to calculate an interference signal from cells adjacent to a cell to which a terminal belongs, and correlate the interference signal for a predetermined time to estimate a correlation matrix of the interference signal. The other is to receive a signal on a frequency-time domain where a terminal that belongs to one cell does not transmit a signal to calculate an interference signal from cells adjacent to the cell to which the terminal belongs, and correlate the interference signal for a predetermined time to estimate a correlation matrix of the interference signal. The interference channel information that is estimated by the above-described method may be used in order for the terminal to effectively receive a signal from the base station of the corresponding cell (H. Dai, A. F. Molisch, and H. V. Poor, "Downlink Capacity of Interference-Limited MIMO Systems with Joint Detection". IEEE Transactions on Wireless Communications, vol. 3, no. 2, pp. 442-453, March 2004), and to determine a transmission method in consideration of an influence due to interference on the base stations of the cells adjacent to the cell to which the terminal belongs, when the terminal transmits a signal in the future.

The process of obtaining interference channel information between the terminal and the base stations of the cells adjacent to the cell to which the corresponding terminal belongs has been described. Also, the above-described method may be used when obtaining interference channel information between the base station and the terminals of the cells adjacent to the cell to which the corresponding base station belongs.

The transmission method implementing unit 120 uses the desired channel information and the interference channel information estimated by the channel information estimating unit 110 to implement a transmission method in consideration of not only performance of the cell to which the terminal 100A belongs but also an influence due to interference on the cells adjacent to the cell to which the terminal 100A belongs.

A method in which the transmission method implementing unit 120 implements a transmission method will be described in detail below. The transmission method that will be described below is only an example of a transmission method to allow the present invention to be clearly understood, and the present invention is not limited thereto. That is, various transmission methods may be implemented.

Figure 2:
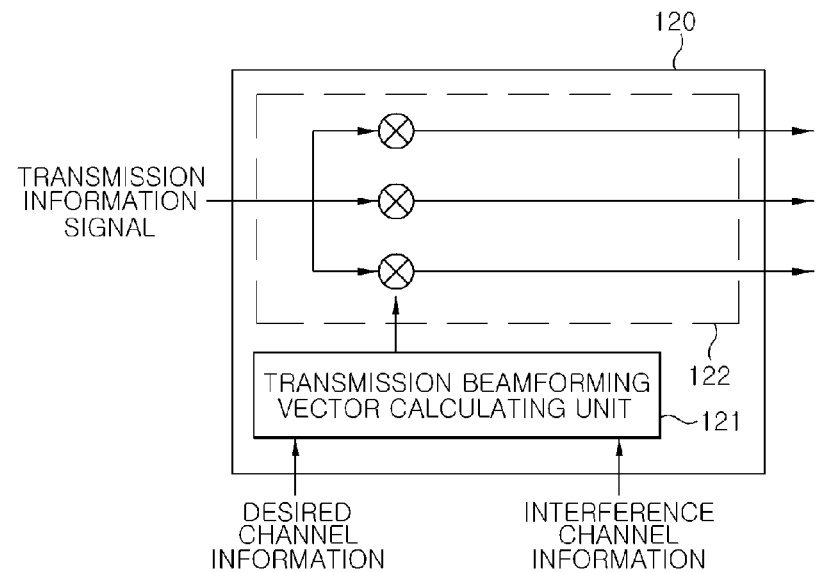
FIG. 2 is a block diagram illustrating a transmission method implementing unit when using a transmission beamforming method as a transmission method that not only considers performance of a corresponding cell but also an influence due to interference on adjacent cells.

FIG. 2 is a block diagram illustrating a transmission method implementing unit when using a transmission beamforming method as a transmission method that not only considers performance of a corresponding cell but also an influence due to interference on adjacent cells.

The transmission beamforming is a technology that is used to transmit a data signal after multiplying the data signal by a different weighting value for each antenna. The weighting value by which each antenna is multiplied is determined by a transmission beamforming vector. A method is suggested below, in which the transmission method implementing unit 120 determines a transmission beamforming vector in consideration of not only performance of a corresponding cell but also an influence due to interference on adjacent cells.

First, it is assumed that the number of cells is M, Nt antennas exist in each terminal, and Nr antennas exist in each base station. For convenience of description, a desired channel matrix $H_d^{(m)}$ and an interference channel matrix $H_i^{(m)}$ in the terminal of the m-th cell are defined by Math Figures 4 and 5, respectively.

MathFigure 4

$$H_d^{(m)} = H_{m,m} \qquad \text{[Math. 4]}$$

MathFigure 5

$$H_i^{(m)} = \begin{bmatrix} H_{1,m} \\ \ldots \\ H_{m-1,m} \\ H_{m+1,m} \\ \ldots \\ H_{M,m} \end{bmatrix} \qquad \text{[Math. 5]}$$

In this case, $H_{m,n}$ denotes a desired channel matrix (Nt×Nr) between the terminal of the n-th cell and the base station of the m-th cell. Thus, the desired channel matrix means a channel response matrix (Nt×Nr) between the terminal and the base station of the corresponding cell, and the interference channel matrix means a channel response matrix (Nt×Nr·(M−1)) between the terminal and base stations of adjacent cells.

The transmission method implementing unit 120 that implements a transmission method through transmission beamforming includes a transmission beamforming vector calculating unit 121 and a transmission beamforming implementing unit 122. The transmission beamforming vector calculating unit 121 receives desired channel information and interference channel information, and calculates a transmission beamforming vector in consideration of an influence due to interference on not only a base station of the corresponding cell but also base stations of cells adjacent to the corresponding cell, on the basis of the desired channel information and the interference channel information. A specific method that is used to calculate the transmission beamforming vector will be described in detail below. The transmission beamforming implementing unit 122 transmits a signal, which is obtained by multiplying a transmission information signal to be transmitted by a different weighting value for each antenna, to multiple antennas.

Hereinafter, a method will be described in which a transmission beamforming vector is calculated in consideration of an influence due to interference on not only a base station of a corresponding cell but also base stations of cells adjacent to the corresponding cell. As a specific example, a minimum interference transmission beamforming scheme and a maximum SGINR transmission beamforming scheme will be described.

First Embodiment

Minimum Interference Transmission Beamforming Scheme

In the minimum interference transmission beamforming scheme, a transmission beamforming vector that is capable of minimizing an influence due to interference on adjacent cells is calculated. When the minimum interference transmission beamforming scheme is used, the transmission beamforming vector that is used by the terminal of the m-th cell can be represented by the following Math Figure 6.

MathFigure 6

$$w_m^{(1)} = \operatorname*{argmin}_{w} \|H_i^{(m)} w\|^2 \text{ subject to } \|w\|^2 = 1 \qquad \text{[Math. 6]}$$

Figure 5:
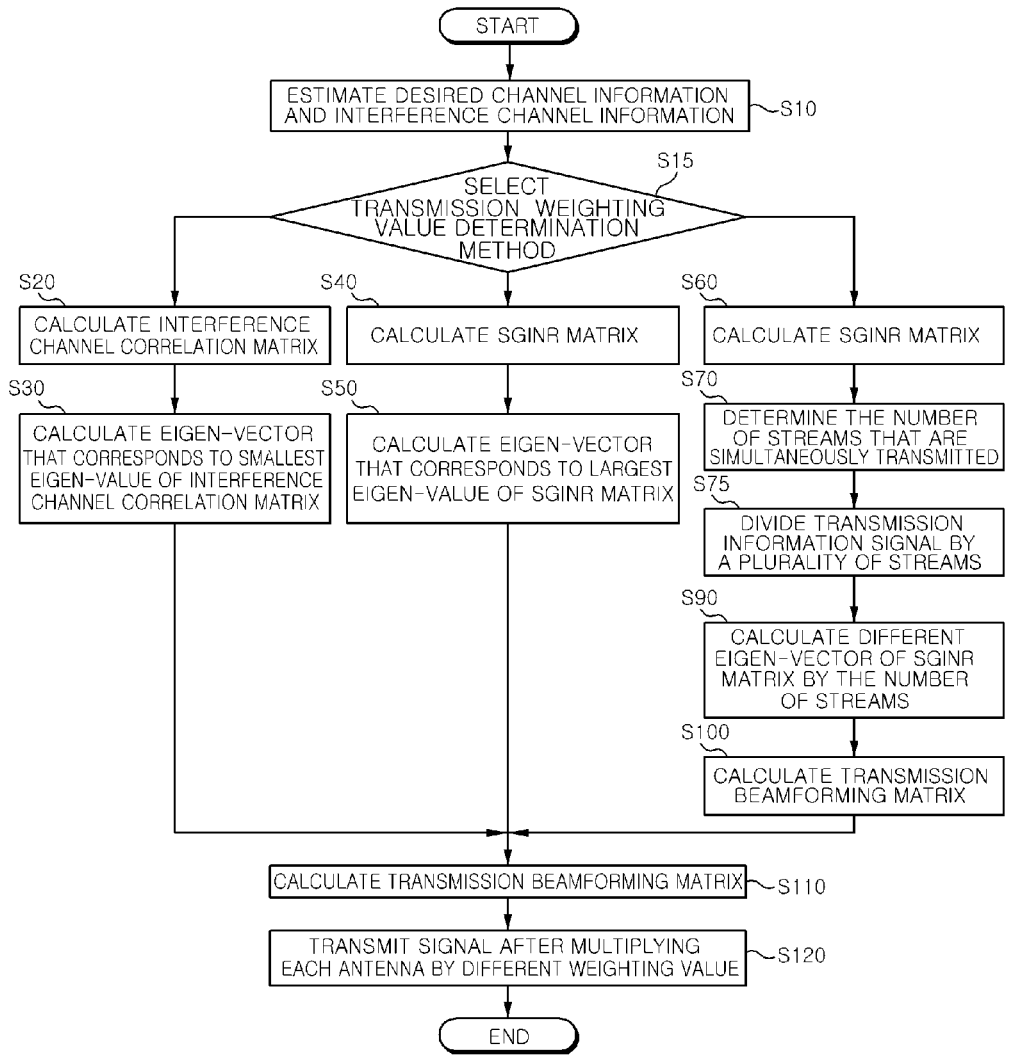
FIG. 5 is a flowchart illustrating a method in which a base station, which has a plurality of antennas used for communication in a multi-user and multi-cell environment, transmits a data stream in consideration of not only performance of a corresponding cell but also an influence due to interference on adjacent cells.

Referring to FIG. 5, the channel information estimating unit 110 estimates the desired channel information and the interference channel information (S10). If a transmission weighting value determination method in the transmission method implementing unit 120 is selected as a minimum interference transmission beamforming scheme (S15), the transmission beamforming vector calculating unit 121 receives interference channel information that is estimated by the channel information estimating unit 110, and calculates an interference channel correlation matrix $$(H_i^{(m)})^H H_i^{(m)}$$

that is the channel response matrix (Nt×Nr·(M−1)) between the terminal and the base stations of the adjacent cells, on the basis of the interference channel information (S20). The transmission beamforming vector calculating unit 121 calculates an eigen-vector that corresponds to the smallest eigen-value of $$(H_i^{(m)})^H H_i^{(m)}$$

(S30). That is, the transmission beamforming vector calculating unit 121 calculates the eigen-vector that corresponds to the smallest eigen-value of $$(H_i^{(m)})^H H_i^{(m)}$$

and uses the eigen-vector as a transmission beamforming vector. Accordingly, the transmission beamforming vector calculating unit 121 derives a different transmission weighting value by which each antenna is multiplied (S110), and the transmission beamforming implementing unit 122 multiplies each antenna by the derived different transmission weighting value and then transmits the obtained signal (S120). If the number of transmitting antennas in a corresponding cell is larger than the number of receiving antennas in adjacent cells, the adjacent cells are not affected by interference, and a spatial degree of freedom may be used in increasing a signal-to-noise ratio in the base station of the corresponding cell. In this case, the transmission beamforming vector that the terminal of the m-th cell uses can be represented by Math Figure 7.

MathFigure 7

$$w_m^{(2)} = \operatorname*{argmax}_{w} \|H_d^{(m)} w\|^2 \text{ subject to } \|H_i^{(m)} w\|^2 = 0 \text{ and } \|w\|^2 = 1 \qquad \text{[Math. 7]}$$

As such, the minimum interference transmission beamforming scheme is mainly used to minimize an influence due to interference on adjacent cells. Thus, the minimum interference transmission beamforming scheme may be effectively used in a multi-cell environment where interference between cells is severe.

Second Embodiment

Maximum SGINR Transmission Beamforming Scheme

The maximum SGINR (Signal to Generating Interference Noise Ratio) transmission beamforming scheme provides a most preferable transmission beamforming scheme in consideration of performance of a corresponding cell and an influence due to interference on adjacent cells. Referring to FIG. 5, the channel information estimating unit 110 estimates desired channel information and interference channel information (S10). If a transmission weighting value determination method in the transmission method implementing unit 120 is selected as a maximum SGINR transmission beamforming scheme (S15), the transmission beamforming vector calculating unit 121 receives the desired channel information and the interference channel information that are estimated by the channel information estimating unit 110, thereby calculating a SGINR of when

W is used as a transmission beamforming vector in the m-th cell. The SGINR is defined by Math Figure 8.

MathFigure 8

$$\Gamma_m(w) = \frac{\|H_d^{(m)} w\|^2}{\|H_i^{(m)} w\|^2 + \sigma_N^2} \qquad \text{[Math. 8]}$$

In this case, a numerator of $\Gamma_m(w)$ denotes signal power in a base station of a corresponding cell, and a denominator thereof denotes the sum of power of interference on base stations of adjacent cells and noise power in the base station. That is, the transmission beamforming vector that increases the SGINR means a transmission beamforming vector that decreases power of interference on the base stations of the adjacent cells while increasing the SGINR in the base station of the corresponding cell. Thus, it is preferable to use a transmission beamforming vector whose SGINR is large in terms of the entire system.

Figure 9:
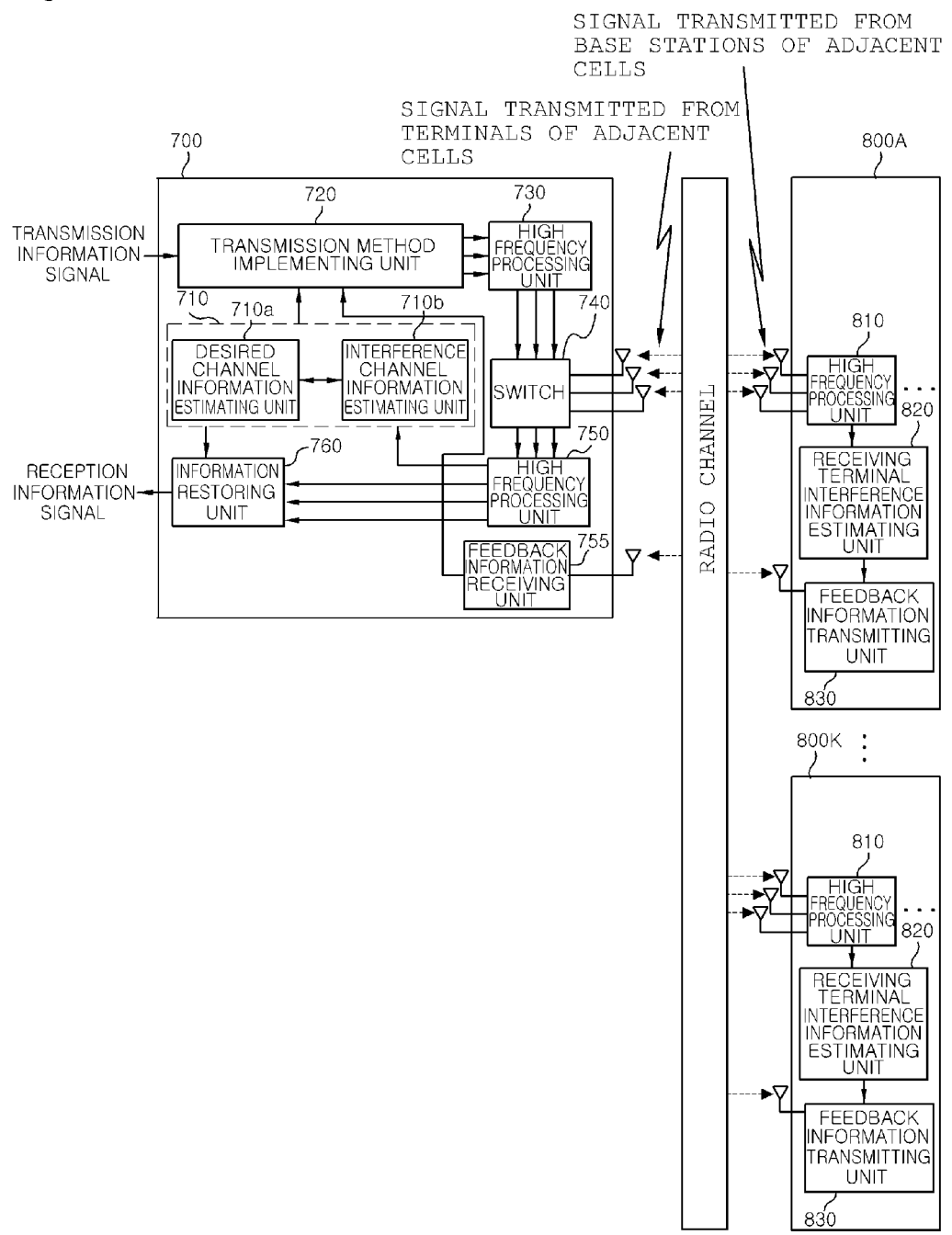
FIG. 9 is a block diagram illustrating a system in which a base station, which has a plurality of antennas used for communication in a multi-user and multi-cell environment, transmits a data stream to K terminals in consideration of not only performance of a corresponding cell but also an influence due to interference on adjacent cells and an influence due to interference from the adjacent cells.

In the maximum SGINR transmission beamforming scheme, a vector that maximizes the SGINR is used as a transmission beamforming vector, and a transmission beamforming vector that is used by a terminal of the m-th cell can be represented by Math Figure 9.

MathFigure 9

$$w_m^{(2)} = \operatorname*{argmax}_{w} \Gamma_m(w) \text{ subject to } \|w\|^2 = 1 \qquad \text{[Math. 9]}$$

Figure 10:
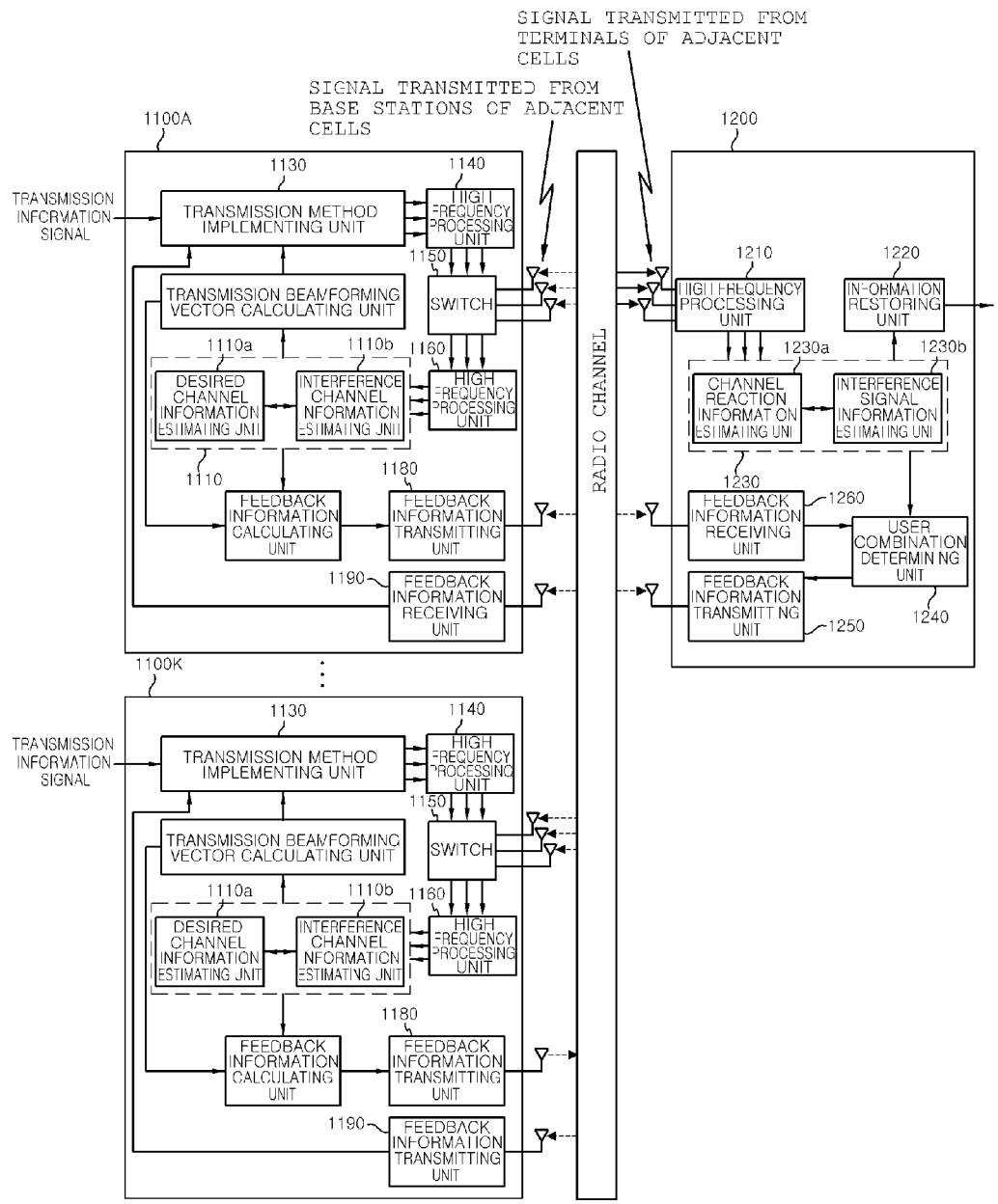
FIG. 10 is a block diagram illustrating a system in which K terminals, which have a plurality of antennas used for communication in a multi-user and multi-cell environment, transmit a data stream to a base station in consideration of not only performance of a corresponding cell but also an influence due to interference on adjacent cells and an influence due to interference from the adjacent cells.

In order to solve this problem, a SGINR matrix in the m-th cell is defined by Math Figure 10.

Math FIG. 10

$$K_{SGINR}^{(m)} = (H_i^{(m)H} H_i^{(m)} + \sigma_N^2 I_{N_1})^{-1} (H_d^{(m)H} H_d^{(m)}) \qquad \text{[Math.10]}$$

In this case, $w_m^{(2)}$ can be obtained as an eigen-vector that corresponds to the largest eigen-value of $K_{SGINR}^{(m)}$.

That is, the transmission beamforming vector calculating unit 121 calculates a SGINR matrix $K_{SGINR}^{(m)}$ in a maximum SGINR transmission beamforming scheme, and calculates an eigen-vector that corresponds to the largest eigen-value of $K_{SGINR}^{(m)}$ so as to use it as a transmission beamforming vector (S40 and S50). Accordingly, the transmission beamforming vector calculating unit 121 derives a different transmission weighting value by which each antenna is multiplied (S110), and the transmission beamforming implementing unit 122 transmits a signal after multiplying each antenna by a different transmission weighting value (S120). As such, the maximum SGINR transmission beamforming scheme is a representative example that not only considers performance of a corresponding cell but also an influence due to interference on adjacent cells in a multi-cell environment, and provides a preferable transmission beamforming method in the multi-cell environment.

FIG. 3 is a block diagram illustrating a transmission method implementing unit when using a multi-stream transmission method as a transmission method that not only considers performance of a corresponding cell but also an influence due to interference on adjacent cells.

The transmission method implementing unit 120 that implements a transmission method through multi-stream beamforming includes a transmission beamforming matrix calculating unit 124, a stream number determining unit 125, a stream multiplexing unit 126, and a multi-stream beamforming implementing unit 128. The transmission beamforming matrix calculating unit 124 receives the desired channel information and the interference channel information and calculates a transmission beamforming matrix in consideration of not only performance of a corresponding cell but also an influence due to interference on adjacent cells. The stream number determining unit 125 receives the desired channel information and the interference channel information and determines the number of streams in consideration of not only performance of a corresponding cell but also an influence due to interference on adjacent cells. A specific method that calculates the number of streams and a transmission beamforming matrix will be described in detail below. The stream multiplexing unit 126 divides a transmission information signal by a plurality of streams in accordance with the number of streams that is determined by the stream number determining unit 125. The multi-stream beamforming implementing unit 128 multiplies each stream by a different weighting value corresponding to each antenna and then transmits a signal to multiple antennas.

In general, it is known that a data rate is greatly increased in a single cell environment, if multiple antennas are used to simultaneously transmit a plurality of streams. However, in a multi-cell environment, to transmit a plurality of streams is not an optimal transmission method. If a large number of streams are transmitted, it may help to improve performance of a corresponding cell, but may cause the base stations of the adjacent cells to be further affected by interference, resulting in deteriorating performance of the adjacent cells. Thus, Multi-stream transmission method can improve the performance of the entire system, if not only performance of the corresponding cell but also an influence due to interference on the adjacent cells are considered when developing multi-stream transmission method. Meanwhile, two elements need to be determined in order to develop a multi-stream transmission method. One is the number of streams that are simultaneously transmitted and the other is a transmission beamforming matrix that is used by streams for transmission beamforming. In this case, it is assumed that the k-th column vector of the transmission beamforming matrix is a transmission beamforming vector that is used by the k-th stream for transmission beamforming.

Hereinafter, a method will be described below, in which the number of streams and a transmission beamforming matrix are calculated in consideration of not only performance of a corresponding cell but also an influence due to interference on adjacent cells. As specific examples, a multi-stream transmission method based on a threshold value and a multi-stream transmission method based on a water-filling algorithm will be described.

Third Embodiment

Multi-stream Transmission Method Based on a Threshold Value

When a multi-stream transmission method based on a threshold value is used, a transmission beamforming matrix that is used by a terminal of an m-th cell is assumed as $W_m^{(1)}$.

At this time, $W_m^{(1)}$ is a matrix (Nt×Ns$^{(1)}$) that is composed of Ns$^{(1)}$ column vectors. In this case, Ns$^{(1)}$ denotes the number of streams that are simultaneously transmitted. Referring to FIG. 5, the channel information estimating unit 110 estimates desired channel information and interference cannel information (S10). If a transmission weighting value determination method in the transmission method implementing unit 120 is selected as a maximum SGINR transmission beamforming scheme (S15), the beamforming matrix calculating unit 124 receives desired channel information and interference channel information that are estimated by the channel information estimating unit 110 and calculates a SGINR matrix (S60). The SGINR matrix of stream can be calculated by Math Figure 8. In the multi-stream transmission method that is based on a threshold value, the stream number determining unit 125 determines the number of streams Ns$^{(1)}$ as the number of streams whose SGINR is larger than a specific threshold value (S70). That is, if there are a large number of streams whose SGINR is larger than a threshold value, a large number of streams are transmitted, and if there are a small number of streams whose SGINR is larger than the threshold value, a small number of streams are transmitted. In this case, if the threshold value as a system parameter is increased, a relatively small number of streams are transmitted, and if the threshold value is decreased, a relatively large number of streams are transmitted. The stream multiplexing unit 126 divides a transmission information signal to be transmitted by a plurality of streams, on the basis of the determined number of streams (S75). If the number of streams is determined, the transmission beamforming matrix calculating unit 124 calculates a beamforming matrix $W_m^{(1)}$ as represented by Math Figure 11.

MathFigure 11

$$W_m^{(1)} = \sqrt{\frac{1}{N_s^{(1)}}} V_m^{(1)}$$

[Math. 11]

In this case, the column vectors of
$V_m^{(1)}$
are composed of eigen-vectors corresponding to $Ns^{(1)}$ eigen-values in the order of sizes of SGINR matrixes
$K_{SGINR}^{(m)}$.
On the basis of the desired channel information and the interference channel information that are estimated by the channel information estimating unit 110, the transmission beamforming matrix calculating unit 124 calculates a SGINR matrix
$K_{SGINR}^{(m)}$
defined by Math Figure 10, and calculates different eigen-vectors of the SGINR matrix
$K_{SGINR}^{(m)}$
by the number of streams (S90). The transmission beamforming matrix calculating unit 124 calculates a transmission beamforming matrix on the basis of the calculated eigen-vectors and derives a different transmission weighting value by which each antenna is multiplied (S100 and S110). The multi-stream transmission beamforming implementing unit 128 transmits a signal after multiplying each antenna by the derived different weighting value (S120).

Fourth Embodiment

Multi-Stream Transmission Method Based on Water-Filling Algorithm

When using the multi-stream transmission method based on the water-filling algorithm, a beamforming matrix that is used by the terminal of the m-th cell is assumed as
$W_m^{(2)}$.
At this time,
$W_m^{(2)}$
is a matrix ($Nt \times Ns^{(2)}$) that is composed of $Ns^{(2)}$ column vectors. In this case, $Ns^{(2)}$ denotes the number of streams that are simultaneously transmitted. In the multi-stream transmission method based on the water-filling algorithm, the number of streams $Ns^{(2)}$ and the transmission beamforming matrix are determined on the basis of the water-filling algorithm. Referring to FIG. 5, the channel information estimating unit 110 estimates desired channel information and interference channel information (S10). If a transmission weighting value determination method in the transmission method implementing unit 120 is selected as a maximum SGINR transmission beamforming scheme (S15), the transmission beamforming matrix calculating unit 124 receives the desired channel information and the interference channel information that are estimated by the channel information estimating unit 110 and calculates the SGINR matrix (S60). If the SGINR of the k-th stream is defined as
$g_k$,
transmission power
$g_k$
that is allocated to the k-th stream on the basis of the water-filling algorithm can be calculated as represented by Math Figure 12.

MathFigure 12

$$p_k = \left(\lambda - \frac{1}{g_k}\right)^+ \qquad [\text{Math. 12}]$$

In this case, in regards to $(a)^+$ as an operator, if a value of a is larger than 0, $(a)^+$ denotes a, and if the value of a is equal to or larger than 0, $(a)^+$ denotes 0.
$\lambda$
denotes a constant that is used to make the entire transmission power constant. In the multi-stream transmission method based on the water-filling algorithm, the stream number determining unit 125 determines the number of streams $Ns^{(2)}$ as the number of streams to which transmission power larger than 0 is allocated on the basis of the water-filling algorithm (S70). The stream multiplexing unit 126 divides a transmission information signal to be transmitted by a plurality of streams on the basis of the determined number of streams (S75). If the number of streams is determined, the transmission beamforming matrix calculating unit 124 can finally calculate
$W_m^{(2)}$
as represented by Math Figure 13.

MathFigure 13

$$W_m^{(2)} = V_m^{(2)}(P_m)^{1/2} \qquad [\text{Math.13}]$$

In this case, In this case, the column vectors of
$W_m^{(2)}$
are composed of eigen-vectors corresponding to $Ns^{(2)}$ eigen-values in the order of sizes of SGINR matrixes
$K_{SGINR}^{(m)}$
that is defined by Math Figure 10.
$P_m$
denotes a diagonal matrix ($Ns^{(2)} \times Ns^{(2)}$) that indicates transmission power allocated to a stream, and a k-th diagonal component can be calculated as
$p_k$
that is obtained by Math Figure 12. On the basis of the desired channel information and the interference channel information that are estimated by the channel information estimating unit 110, the transmission beamforming matrix calculating unit 124 calculates a SGINR matrix
$K_{SGINR}^{(m)}$
that is defined by Math Figure 10, and calculates different eigen-vectors of the SGINR matrix
$K_{SGIRN}^{(m)}$
by the number of streams (S90). The transmission beamforming matrix calculating unit 124 calculates a transmission beamforming matrix on the basis of the calculated eigen-vectors and derives a different transmission weighting value by which each antenna is multiplied (S100 and S110). The multi-stream transmission beamforming implementing unit 128 transmits a signal after multiplying each antenna by the derived different weighting value (S120).

Hereinafter, a method will be described, in which a transmission method implementing unit implements a transmission method on the basis of a maximum interference permissible amount, as a transmission method that not only considers performance of a corresponding cell but also an influence due to interference on adjacent cells.

Fifth Embodiment

Figure 14:
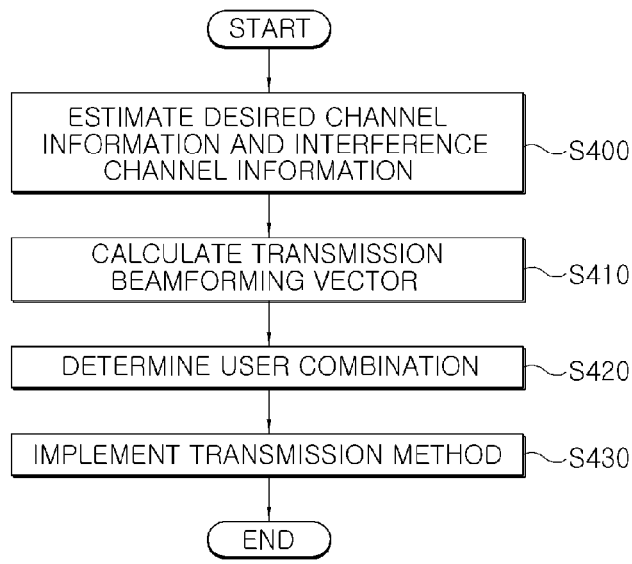
FIG. 14 is a block diagram illustrating a method in which a base station, which has a plurality of antennas used for communication in a multi-user and multi-cell environment, transmits data to K terminals in consideration of not only performance of a corresponding cell but also an influence due to interference on adjacent cells.

Transmission Method Implementation Method Based on a Maximum Interference Permissible Amount If a maximum interference permissible amount of the m-th cell is defined as $b_m$, the transmission method implementing unit 120 implements a transmission method while limiting a total sum of interference on adjacent cells to the maximum interference permissible amount or less, as represented by Math Figure 14. In this case, the maximum interference permissible amount means a maximum permissible amount of interference on adjacent cells from a transmitting terminal.

MathFigure 14

$$\|H_i^{(m)} W_m\|^2 \le \beta_m \quad \text{[Math. 14]}$$

MathFigure 15

$$W_m = \underset{W_m}{\arg\max} \log_2 \det\left(I + (H_d^{(m)} W_m)(H_d^{(m)} W_m)^H\right) \quad \text{[Math. 15]}$$

subject to $$\|H_i^{(m)} W_m\|^2 \le \beta_m$$

Since Math FIG. 15 is related to a convex problem, a solution can be calculated using a convex optimization algorithm.

(Multi-User Transmission Method that not only Considers Performance of a Corresponding Cell but also an Influence Due to Interference on Adjacent Cells During a Downlink)

Figure 4:
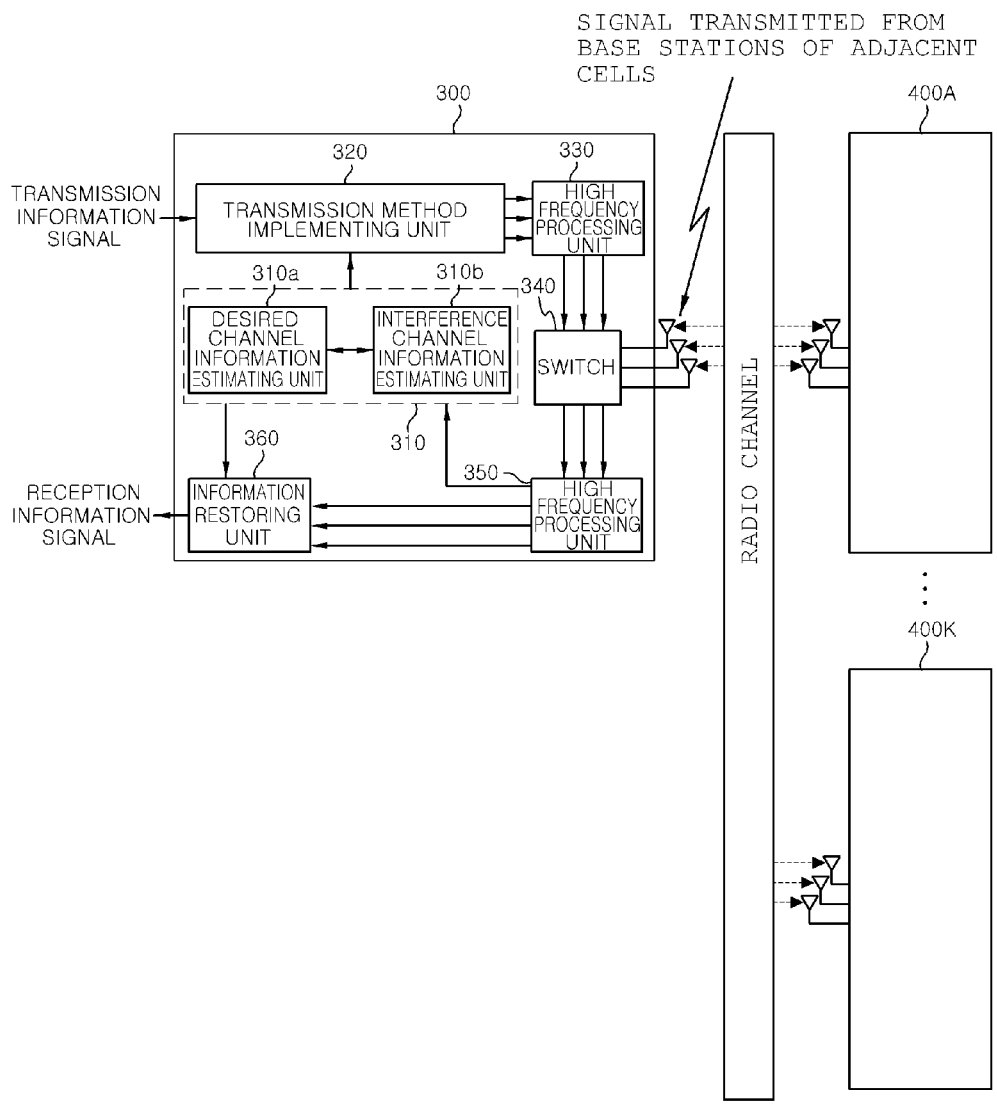
FIG. 4 is a block diagram illustrating a system in which a base station, which has a plurality of antennas used for communication in a multi-user and multi-cell environment, transmits a data stream to K terminals in consideration of not only performance of a corresponding cell but also an influence due to interference on adjacent cells.

FIG. 4 is a block diagram illustrating a system in which a base station, which has a plurality of antennas used for communication in a multi-cell environment, transmits a data stream to K terminals in consideration of not only performance of a corresponding cell but also an influence due to interference on adjacent cells. FIG. 4 shows only one cell that includes one base station 300 and a plurality of terminals 400A to 400K to allow the present invention to be clearly understood. Actually, a plurality of cells exist, and one base station 300 and the plurality of terminals 400A to 400K exist in each cell, as shown in FIG. 4.

The base station 300 includes a channel information estimating unit 310, a transmission method implementing unit 320, high frequency processing units 330 and 350, a switch 340, and an information restoring unit 360.

It is assumed that the channel information estimating unit 310, the transmission method implementing unit 320, the high frequency processing units 330 and 350, the switch 340, and the information restoring unit 360 have the same configurations and functions as the channel information estimating unit 110, the transmission method implementing unit 120, the high frequency processing units 130 and 150, the switch 140, and the information restoring unit 160 in the above description of uplink. Accordingly, the description of the channel information estimating unit 310, the transmission method implementing unit 320, the high frequency processing units 330 and 350, the switch 340, and the information restoring unit 360 may be substituted by the description of uplink, which can be understood by those who skilled in the art.

The multi-user transmission method that not only considers performance of a corresponding cell but also an influence due to interference on adjacent cells in a multi-cell environment has been described.

Hereinafter, a multi-user transmission method that not only considers performance of a corresponding cell but also an influence due to interference on adjacent cells and an influence due to interference from the adjacent cells in a multi-cell environment will be described for each case of uplink and downlink.

(Multi-User Transmission Method that not only Considers Performance of a Corresponding Cell but also an Influence Due to Interference on Adjacent Cells and an Influence Due to Interference from the Adjacent Cells During an Uplink)

First, in order to implement a transmission method that additionally considers an influence due to interference on a terminal of a corresponding cell from adjacent cells, a base station of the corresponding cell needs to estimate interference information from terminals of adjacent cells and feedback the estimated interference information to the terminals. Hereinafter, the interference information that the base station of the corresponding cell receives from the terminals of the adjacent cells is referred to as receiving terminal interference information.

Figure 6:
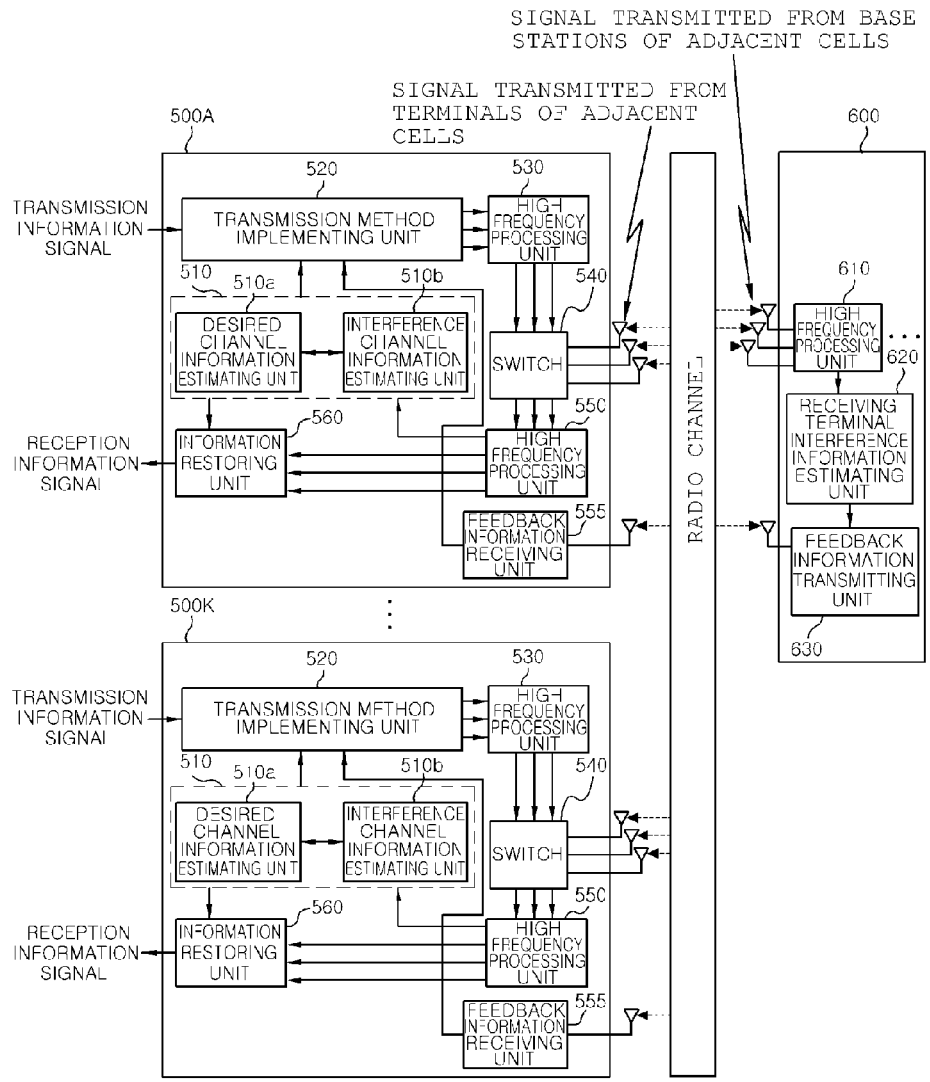
FIG. 6 is a block diagram illustrating a system in which K terminals, which have a plurality of antennas used for communication in a multi-user and multi-cell environment, transmit a data stream to a base station in consideration of not only performance of a corresponding cell but also an influence due to interference on adjacent cells and an influence due to interference from the adjacent cells.

FIG. 6 is a block diagram illustrating a system in which K terminals, which have a plurality of antennas used for communication in a multi-cell environment, transmit a data stream to a base station in consideration of not only performance of a corresponding cell but also an influence due to interference on adjacent cells and an influence due to interference from the adjacent cells.

The configuration of FIG. 6 further includes a process in which the base station estimates the receiving terminal interference information through the signals received from the terminals of the adjacent cells and a process in which the estimated receiving terminal interference information is fed back to the terminals, in addition to the configuration of FIG. 1.

FIG. 6 shows only one cell that includes a plurality of terminals 500A to 500K and one base station 600 to allow the present invention to be clearly understood. Actually, a plurality of cells exist, and the plurality of terminals 500A to 500K and one base station 600 exist in each cell, as shown in FIG. 6. Since the terminals 500A to 500K all have the same configuration, only one terminal 500A will be described in order to avoid a repetitive description.

As shown in FIG. 6, the high frequency processing unit 610 of the base station 600 converts a signal from terminals of adjacent cells into a base band signal and transmits the base band signal to a receiving terminal interference information estimating unit 620. The receiving terminal interference information estimating unit 620 receives the signal from the terminals of the adjacent cells and estimates receiving terminal interference information. The receiving terminal interference information is estimated using the above-described channel reciprocity. The feedback information transmitting unit 630 receives the receiving terminal interference information that is estimated by the receiving terminal interference information estimating unit 620 and transmits the receiving terminal interference information through a radio communication network to the terminal 500A.

The terminal 500A includes a channel information estimating unit 510, a transmission method implementing unit 520, high frequency processing units 530 and 550, a switch 540, a feedback information receiving unit 555, and an information restoring unit 560.

It is assumed that the channel information estimating unit 510, the high frequency processing units 530 and 550, the switch 540, and the information restoring unit 560 have the same configurations and functions as the channel information estimating unit 110, the high frequency processing units 130 and 150, the switch 140, and the information restoring unit 160 in the multi-user transmission method that not only considers performance of a corresponding cell but also an influence due to interference on adjacent cells during the above-described uplink. Accordingly, a specific description of the channel information estimating unit 310, the high frequency processing units 330 and 350, the switch 340, and the information restoring unit 360 may be substituted by the above description.

The feedback information receiving unit 555 receives receiving terminal interference information from a feedback information transmitting unit 630 of the base station 600 and transmits the receiving terminal interference information to the transmission method implementing unit 520.

The transmission method implementing unit 520 receives the desired channel information and the interference channel information that are estimated by the channel information estimating unit 510. The transmission method implementing unit 520 receives the receiving terminal interference information from the feedback information receiving unit 555 and implements a transmission method that not only performance of a corresponding cell but also an influence due to interference on adjacent cells and an influence due to interference from the adjacent cells.

In this case, a method in which the transmission method implementing unit 520 implements a transmission method will be described in detail. The transmission method that will be described below is only exemplary, and the present invention is not limited thereto. That is, various transmission methods may be implemented.

Figure 7:
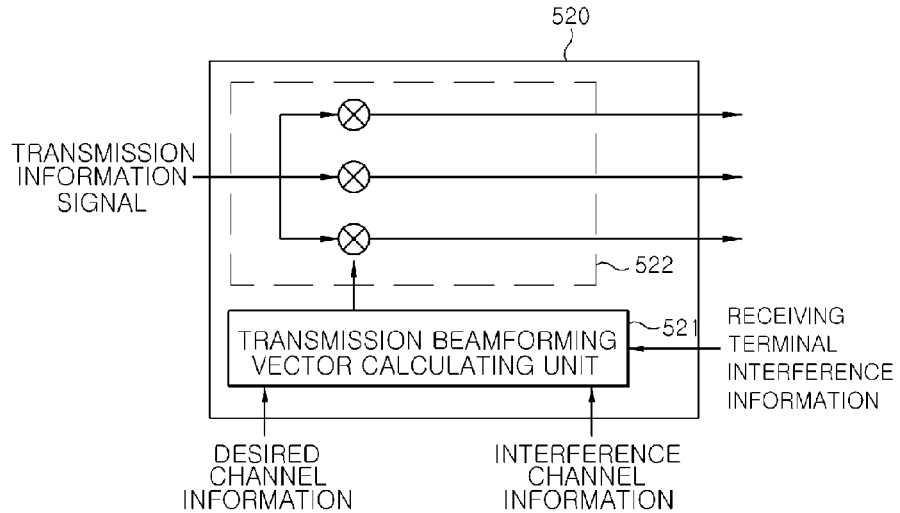
FIG. 7 is a block diagram illustrating a transmission method implementing unit when using a transmission beamforming method as a transmission method that not only considers performance of a corresponding cell but also an influence due to interference on adjacent cells and an influence due to interference from the adjacent cells.

FIG. 7 is a block diagram illustrating a transmission method implementing unit when using a transmission beamforming method as a transmission method that not only considers performance of a corresponding cell but also an influence due to interference on adjacent cells and an influence due to interference from the adjacent cells.

As shown in FIG. 7, the transmission method implementing unit 520 includes a transmission beamforming vector calculating unit 521 and a transmission beamforming implementing unit 522.

The transmission beamforming vector calculating unit 521 receives desired channel information, interference channel information, and receiving terminal interference information, and calculates a transmission beamforming vector.

The transmission beamforming implementing unit 522 receives the transmission beamforming vector that is calculated by the transmission beamforming vector calculating unit 521, multiplies a signal to be transmitted by a different weighting value corresponding to each antenna, and transmits the obtained signal to multiple antennas.

Hereinafter, a method will be described in which a transmission beamforming vector is calculated in consideration of not only performance of a corresponding cell but also an influence due to interference on adjacent cells and an influence due to interference from the adjacent cells. The receiving terminal interference information that is fed back to a terminal from a base station of the m-th cell is assumed as a correlation matrix
$R_I^{(m)}$
of an interference signal that is received at the base station. In addition, if
$(R_I^{(m)})^{-1/2} H_d^{(m)}$
is used instead of the channel response matrix
$H_d^{(m)}$
in the above-described first and second embodiments in order to apply the receiving terminal interference information, a transmission method may be implemented in consideration of an influence due to interference from the adjacent cells. That is, if
$H_d^{(m)}$
is replaced by
$(R_I^{(m)})^{-1/2} H_d^{(m)}$
to consider performance of a corresponding cell, an influence due to interference on adjacent cells, and an influence due to interference from the adjacent cells, it is possible to implement the minimum interference transmission beamforming scheme and the maximum SGINR transmission beamforming scheme that are described in the first and second embodiments.

Figure 8:
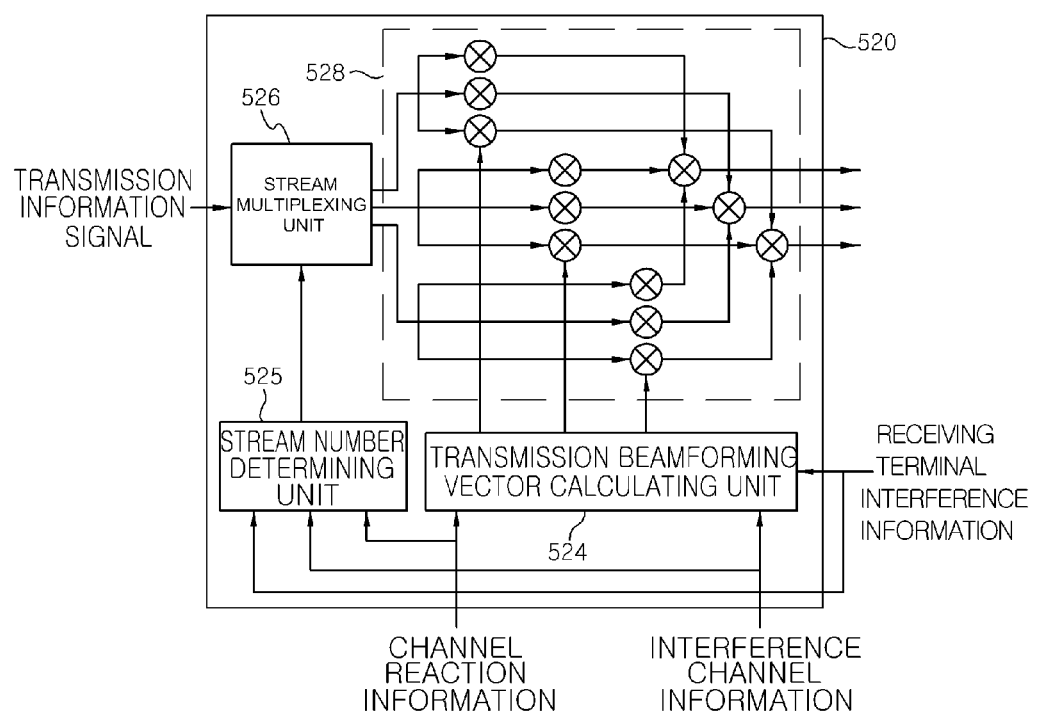
FIG. 8 is a block diagram illustrating a transmission method implementing unit when using a multi-stream transmission method as a transmission method that not only considers performance of a corresponding cell but also an influence due to interference on adjacent cells and an influence due to interference from the adjacent cells.

FIG. 8 is a block diagram illustrating a transmission method implementing unit when using a multi-stream transmission method as a transmission method that not only considers performance of a corresponding cell but also an influence due to interference on adjacent cells and an influence due to interference from the adjacent cells.

As shown in FIG. 8, the transmission method implementing unit 520 includes a transmission beamforming matrix calculating unit 524, a stream number determining unit 525, a stream multiplexing unit 526, and a multi-stream beamforming implementing unit 528.

The transmission beamforming matrix calculating unit 524 receives desired channel information, interference channel information, and receiving terminal interference information, and calculates a beamforming matrix in consideration of not only performance of a corresponding cell but also an influence due to interference on adjacent cells and an influence due to interference from the adjacent cells.

The stream number determining unit 525 receives desired channel information, interference channel information, and receiving terminal interference information, and determines the number of streams in consideration of performance of a corresponding cell but also an influence due to interference on adjacent cells and an influence due to interference from the adjacent cells.

The stream multiplexing unit 526 divides a transmission information signal by a plurality of streams according to the number of streams that is determined by the stream number determining unit 525.

The multi-stream beamforming implementing unit 528 multiplies each stream by a different weighting value corresponding to each antenna and transmits a signal to multiple antennas.

Hereinafter, a method will be described in which the number of streams and a transmission beamforming matrix are calculated in consideration of not only performance of a corresponding cell but also an influence due to interference on adjacent cells and an influence due to interference from the adjacent cells. The receiving terminal interference information that is fed back to a terminal from a base station of the m-th cell is assumed as a correlation matrix
$R_I^{(m)}$
of an interference signal that is received at the base station. In addition, if
$(R_I^{(m)})^{-1/2} H_d^{(m)}$
is used instead of the channel response matrix
$H_d^{(m)}$
in the above-described third and fourth embodiments in order to apply the receiving terminal interference information, a transmission method may be implemented in consideration of an influence due to interference from the adjacent cells. That is, if
$H_d^{(m)}$
is replaced by
$(R_I^{(m)})^{-1/2} H_d^{(m)}$
to consider performance of a corresponding cell, an influence due to interference on adjacent cells, and an influence due to interference from the adjacent cells, it is possible to implement the transmission methods that are described in the third to fifth embodiments.

(Multi-User Transmission Method that not only Considers Performance of a Corresponding Cell but also an Influence Due to Interference on Adjacent Cells and an Influence Due to Interference from the Adjacent Cells During a Downlink)

First, in order to implement a transmission method that additionally considers an influence due to interference on a base station of a corresponding cell from adjacent cells, a terminal of the corresponding cell needs to estimate interference information from base stations of adjacent cells and feedback the estimated interference information to the base station. Hereinafter, the interference information that the terminal of the corresponding cell receives from the base stations of the adjacent cells is referred to as receiving terminal interference information.

FIG. 9 is a block diagram illustrating a system in which a base station, which has a plurality of antennas used for communication in a multi-cell environment, transmits a data stream to K terminals in consideration of not only performance of a corresponding cell but also an influence due to interference on adjacent cells and an influence due to interference from the adjacent cells.

FIG. 9 shows only one cell that includes one base station 700 and a plurality of terminals 800A to 800K to allow the present invention to be clearly understood. Actually, a plurality of cells exist, and one base station 700 and the plurality of terminals 800A to 800K exist in each cell, as shown in FIG. 9.

The configuration of FIG. 9 further includes a process in which the terminal estimates the receiving terminal interference information through the signals received from the base stations of the adjacent cells and a process in which the estimated receiving terminal interference information is fed back to the base stations, in addition to the configuration of FIG. 4.

The base station 700 include a channel information estimating unit 710, a transmission method implementing unit 720, high frequency processing units 730 and 750, a switch 740, a feedback information receiving unit 755, and an information restoring unit 760.

It is assumed that the channel information estimating unit 710, the transmission method implementing unit 720, the high frequency processing units 730 and 750, the switch 740, the feedback information receiving unit 755, and the information restoring unit 760 have the same configurations and functions as the channel information estimating unit 510, the transmission method implementing unit 520, the high frequency processing units 530 and 550, the switch 540, the feedback information receiving unit 555, and the information restoring unit 560 in the multi-user transmission method that not only considers performance of a corresponding cell but also an influence due to interference on adjacent cells and an influence due to interference from the adjacent cell during the uplink. Accordingly, a specific description of the channel information estimating unit 710, the transmission method implementing unit 720, the high frequency processing units 730 and 750, the switch 740, the feedback information receiving unit 755, and the information restoring unit 560 is substituted by the above description.

Hereinafter, a multi-user transmission method will be described, in which a user combination and a transmission beamforming vector are determined in consideration of not only performance of a corresponding cell but also an influence due to interference on adjacent cells and an influence due to interference from the adjacent cells in a multi-cell environment in each of uplink and downlink.

(Multi-User Transmission Method that Determines a User Combination and a Transmission Beamforming Vector in Consideration of Performance of a Corresponding Cell but also an Influence Due to Interference on Adjacent Cells and an Influence Due to Interference from the Adjacent Cells During an Uplink)

First, it is assumed that the number of cells is M, K users exist in each of the cells, a terminal used by each user has Nu antennas, and a base station has Nb antennas. In this case, a signal that the m-th base station receives can be represented by Math FIG. 16.

MathFigure 16

$$y_m = \sum_{k \in S_m} H^{up}_{(m,k,m)} w_{(m,k)} x_{(m,k)} + \sum_{n \neq m} \sum_{k' \in S_n} H^{up}_{(n,k',m)} w_{(n,k')} x_{(n,k')} + n_m \qquad \text{[Math. 16]}$$

In this case, $S_m$ denotes a user combination that transmits data signals in the m-th cell, $H_{(m,k,n)}^{up}$ denotes a channel response matrix (Nb×Nu) between the k-th terminal of the m-th cell and the base station of the n-th cell, $w_{(m,k)}$ denotes a transmission beamforming vector (Nu×1) that is used by the k-th terminal of the m-th cell, $x_{(k,m)}$ denotes a data signal that the k-th terminal of the m-th cell transmits to the base station, and $n_m$ denotes a reception noise vector (Nb×1) in the base station of the m-th cell.

The present invention includes contents that are related to a method in which a base station of each cell determines a user combination ( $S_m$ ) and a method in which a terminal determines a transmission beamforming vector ( $W_{(m,k)}$ ). In particular, the present invention suggests an apparatus and method that can improve performance of the entire system in consideration of not only performance of a corresponding cell but also an influence due to interference between adjacent cells, when a user combination and a transmission beamforming vector are determined.

FIG. 10 is a block diagram illustrating a system in which K terminals, which have a plurality of antennas used for communication in a multi-cell environment, transmit a data stream to a base station in consideration of not only performance of a corresponding cell but also an influence due to interference on adjacent cells and an influence due to interference from the adjacent cell.

FIG. 10 shows only one cell that includes a plurality of terminals 1100A to 1100K and one base station 1200 to allow the present invention to be clearly understood. As described above, a plurality of cells exist, and the plurality of terminals 1100A to 1100K and one base station 1200 exist in each of the cells, as shown in FIG. 10. That is, the configuration of FIG. 10 shows a multi-cell and multi-user environment. Since the terminals 1100A to 1100K all have the same configuration, only one terminal 1100A will be described in order to avoid a repetitive description.

Referring to FIG. 10, the terminal 1100A according to the present invention includes a channel estimating unit 1110, a transmission beamforming vector calculating unit 1120, a transmission method implementing unit 1130, high frequency processing units 1140 and 1160, a switch 1150, a feedback information calculating unit 1170, a feedback information transmitting unit 1180, and a feedback information receiving unit 1190.

The transmission method implementing unit 1130 receives feedback information and a transmission beamforming vector from the feedback information receiving unit 1190 and the transmission beamforming vector calculating unit 1120, respectively, and implements a transmission method of an information signal to be transmitted. At this time, the feedback information is information that is related to a user combination, and the feedback information receiving unit 1190 receives the feedback information from the base station 1200 of the corresponding cell and transmits the feedback information to the transmission method implementing unit 1130.

The high frequency processing unit 1140 transmits a high frequency signal received from the transmission method implementing unit 1120 into a base band signal and transmits the base band signal.

The switch 1150 receives a high frequency signal from a base station of a corresponding cell and base stations of adjacent cells through multiple antennas and transmits the high frequency signal to the high frequency processing unit 1160. The switch 1150 receives the base band signal that is transmitted from the high frequency processing unit 1140 and transmits the base band signal to the base station 1200 through multiple antennas.

The high frequency processing unit 1160 converts the high frequency signal received from the switch 1150 into a base band signal and transmits the base band signal to the channel estimating unit 1110.

The channel estimating unit 1110 includes a desired channel information estimating unit 1110a and an interference channel information estimating unit 1110b.

The desired channel information estimating unit 1110a uses a signal that is received from the base station 1200 of a cell to which the terminal 1100A belongs and estimates desired channel information between the terminal 1100A and the base station 1200. At this time, the desired channel information indicates information that is related to a channel between the terminal 1100A and the base station 1200. For example, with respect to the k-th user of the m-th cell, the desired channel information may be a channel response matrix ($H_{(m,k,m)}^{up}$) between the user of the m-th cell and the base station of the m-th.

The interference channel information estimating unit 1110b uses a signal received from base stations of cells adjacent to a corresponding cell to estimate interference channel information that indicates a degree of interference by which the base station of the cell is affected due to a transmission operation of the terminal 1100A of the corresponding cell. The estimation method that estimates interference channel information in the interference channel information estimating unit 1110b will be described in detail below. The estimation method that will be described below is only exemplary and the present invention is not limited thereto. That is, various estimation methods may be used.

For example, with respect to the k-th user of the m-th cell, the interference channel information may be an individual channel response matrix ($H_{(m,k,m)}^{up}$) between the k-th user of the m-th cell and the base stations of the adjacent cells. However, when it is difficult to estimate an individual channel response matrix with respect to each of the base stations of the adjacent cells, a sum $$\sum_{n \neq m} (H_{(m,k,n)}^{up})^H H_{(m,k,n)}^{up}$$

of correction matrixes of channel response matrixes between the terminal and the adjacent base stations is estimated and may be used as interference channel information. In this case, an upper suffix

H denotes Hermitian of a matrix. Actually, in the present invention, it is possible to use a sum of the correlation matrixes of the channel response matrixes between the terminal and the adjacent base stations instead of the individual channel response matrixes between the terminal and the base stations of the adjacent cells as interference channel information that is necessary when a transmission beamforming vector and a user combination are determined.

The channel estimating unit 1110 estimates desired channel information and interference channel information on the basis of signals, which are received from a base station 1200 of a cell to which the terminal 1100A belongs during a downlink and base stations of adjacent cells. To do so, in the present invention, channel reciprocity between an uplink channel and a downlink channel is used. The channel reciprocity may be represented by Math Figure 17, when an uplink frequency and a downlink frequency are the same.

MathFigure 17

$$H_{(m,k,n)}{}^{up} = (H_{(n,m,k)}{}^{down})^T \qquad [\text{Math.17}]$$

In this case, $H_{(n,m,k)}{}^{down}$ denotes a channel response matrix between the base station of the n-th cell and the k-th terminal of the m-th cell, and the upper suffix

T denotes transpose of a matrix.

When the downlink frequency and the uplink frequency are different from each other as in an FDD system, Math Figure 17 is no longer realized. In this case, it is possible to estimate desired channel information and interference channel information using a correlation between a channel response matrix of the uplink and a channel response matrix of the downlink (B. K. Chalise, L. Haering, and A. Czylwik, "System Level Performance of UMTS-FDD with Covariance Transformation Based DL Beamforming", IEEE Globecom 2003).

The transmission beamforming vector calculating unit 1120 calculates a transmission beamforming vector on the basis of the desired channel information and the interference channel information that are estimated by the channel estimating unit 1110, that is, in consideration of not only performance of a cell to which the terminal 1110A belongs but also an influence due to interference between adjacent cells.

Hereinafter, a method will be described, in which the transmission beamforming vector calculating unit 120 calculates a transmission beamforming vector. As specific examples, a minimum interference transmission beamforming scheme, a maximum SGINR transmission beamforming scheme, and a SGINR transmission beamforming scheme including a cell loading factor of adjacent cells will be described.

First, an interference channel response matrix in the k-th terminal of the m-th cell is defined by Math Figure 18.

MathFigure 18

$$H_{(m,k)}^{I,up} = \begin{bmatrix} H_{(m,k,1)}^{up} \\ \vdots \\ H_{(m,k,m-1)}^{up} \\ H_{(m,k,m+1)}^{up} \\ \vdots \\ H_{(m,k,M)}^{up} \end{bmatrix}$$ [Math. 18]

In Math Figure 18, a correlation matrix ($(H_{(m,k)}^{I,up})^H H_{(m,k)}^{I,up}$) of an interference channel response matrix is the same as a sum ( $$\sum_{n \neq m} (H_{(m,k,n)}^{up})^H H_{(m,k,n)}^{up}$$

) of correlation matrixes of channel response matrixes between the terminal and adjacent base stations.

First Embodiment

Minimum Interference Transmission Beamforming Scheme

In the minimum interference transmission beamforming scheme, a vector that minimizes a size of interference power supplied to adjacent cells is used as a transmission beamforming vector. In this case, a transmission beamforming vector that is used by the k-th user of the m-th cell may be represented by Math Figure 19.

MathFigure 19

$$w_{(m,k)}^1 = \underset{w}{\operatorname{argmin}} \|H_{(m,k)}^{I,up} w\|^2 \text{ subject to } \|w\|^2 = 1$$ [Math. 19]

A process of calculating a transmission beamforming vector in a minimum interference transmission beamforming scheme is as follows. First, a correlation matrix ($(H_{m,k}^{I,up})^H H_{(m,k)}^{I,up}$) of an interference channel response matrix is calculated on the basis of interference channel information that is estimated by the channel estimating unit 1110, and an eigen-vector that corresponds to the smallest eigen-value of a correlation matrix of an interference channel response matrix is calculated and then used as a transmission beamforming vector. Since the main object of the minimum interference transmission beamforming scheme is to minimize an influence due to interference on adjacent cells, the minimum interference transmission beamforming scheme may be effectively used in an environment where interference between cells is severe.

Second Embodiment

Maximum SGINR Transmission Beamforming Scheme

The maximum SGINR transmission beamforming scheme is a transmission beamforming method that can improve performance of all cells in consideration of performance of the corresponding cell and an influence due to interference on adjacent cells. First, in order to describe a maximum SGINR transmission beamforming scheme, a SGINR is defined. The SGINR of when the k-th user of the m-th cell uses a transmission beamforming vector w is defined by Math Figure 20.

MathFigure 20

$$\Gamma_{(m,k)}(w) = \frac{\|H_{(m,k,m)}^{up} w\|^2}{\|H_{(m,k)}^{I,up} w\|^2 + \sigma_N^2}$$ [Math. 20]

In this case, $\sigma_N^2$ denotes power of noise. Thus, a numerator of the SGINR indicates signal power of the base station of the corresponding cell, and a denominator thereof indicates power of interference and power of noise that affect the base stations of the adjacent cells.

In the maximum SGINR transmission beamforming scheme, a vector that maximizes the SGINR is used as a transmission beamforming vector. In this case, a transmission beamforming vector that is used by the k-th user of the m-th cell can be represented by Math Figure 21.

MathFigure 21

$$w_{(m,k)}^2 = \underset{w}{\operatorname{argmax}} \Gamma_{(m,k)}(w) \text{ subject to } \|w\|^2 = 1$$ [Math. 21]

In order to solve this problem, a SGINR matrix is defined by Math Figure 22.

MathFigure 22

$$K_{(m,k)}^{SGINR} = (H_{(m,k)}^{I,up\,H} H_{(m,k)}^{I,up} + \sigma_N^2 I_{Nu})^{-1} (H_{(m,k,m)}^{up\,H} H_{(m,k,m)}^{up})$$ [Math.22]

In the maximum SGINR transmission beamforming scheme, a process of calculating a transmission beamforming vector is as follows. First, a SGINR matrix ($K_{(m,k)}^{SGINR}$) is calculated on the basis of the desired channel information and the interference channel information that are estimated by the channel estimating unit 1110, and an eigen-vector that corresponds to the largest eigen-value of the SGINR matrix is calculated and then used as a transmission beamforming vector.

Third Embodiment

Maximum SGINR Transmission Beamforming Scheme Including a Cell Loading Factor of Adjacent Cells The maximum SGINR transmission beamforming scheme including a cell loading factor of adjacent cells is a transmission beamforming scheme that can improve performance of all cells in consideration of not only performance of the corresponding cell but also an influence due to interference on adjacent cells and a cell loading factor of the adjacent cells.

The cell loading factor of the adjacent cells can be obtained through communication between the base stations. If communication between the base stations is impossible, the cell loading factor of the adjacent cells is estimated on the basis of the cell loading factor of the corresponding cell. The cell loading factor of the adjacent cells is denoted by

α and has a value in a range of 0 to 1. If the cell loading factor

α is 0, this means that communication between the adjacent cells is not made. In this case, it is preferable that an influence due to interference on the adjacent cells be not considered when a transmission method is determined. In contrast, if the cell loading factor

α approximates 1, this means that communication between the adjacent cells is actively made. In this case, it is preferable that an influence due to interference on the adjacent cells be considered when a transmission method is determined. In the present invention, in order to apply these facts, the SGINR matrix including the cell loading factor of the adjacent cells is defined by Math Figure 23.

MathFigure 23

$$\Gamma^{\alpha}_{(m,k)}(w) = \frac{\|H^{up}_{(m,k,m)}w\|^2}{\alpha\|H^{I,up}_{(m,k)}w\|^2 + \sigma_N^2} \qquad [\text{Math. 23}]$$

In the maximum SGINR transmission beamforming scheme including the cell loading factor of the adjacent cells, a vector that maximizes the SGINR including the cell loading factor of the adjacent cells is used as a transmission beamforming vector. In this case, a transmission beamforming vector that is used by the k-th user of the m-th cell is defined by Math Figure 24.

MathFigure 24

$$w^3_{(m,k)} = \underset{w}{\operatorname{argmax}} \Gamma^{\alpha}_{(m,k)}(w) \text{ subject to } \|w\|^2 = 1 \qquad [\text{Math. 24}]$$

In order to solve this problem, the SGINR matrix including the cell loading factor of the adjacent cells is defined by Math Figure 25.

MathFigure 25

$$K_{(m,k)}^{SGINR,\alpha} = (\alpha H_{(m,k)}^{I,up}{}^H H_{(m,k)}^{I,up} + \sigma_N^2 I_{Nu})^{-1} (H_{(m,k,m)}^{up}{}^H H_{(m,k,m)}^{up}) \qquad [\text{Math.25}]$$

In the maximum SGINR transmission beamforming scheme including the cell loading factor of the adjacent cells, a process of calculating a transmission beamforming vector is as follows. First, a SGINR matrix ( $K_{(m,k)}^{SGINR,\alpha}$ ) including the cell loading factor of the adjacent cells is calculated on the basis of the desired channel information and the interference cannel information that are estimated by the channel estimating unit 1110, and an eigen-vector that corresponds to a largest eigen-vector of the SGINR matrix including the cell loading factor of the adjacent cells is calculated and then used as a transmission beamforming vector.

Meanwhile, the base station 1200 determines a user combination that transmits data to the base station 1200 during an uplink. Each of the terminals 1100A to 1100K knows information of interference on the adjacent cells. Thus, each of the terminals 1100A to 1100K needs to calculate information that is needed to determine the user combination and feedback the corresponding information to the base station.

Hereinafter, a method of calculating information that is needed when the feedback information calculating unit 1170 determines the user combination will be described.

In order to consider an influence due to interference on the adjacent cells when the user combination is determined, each of the terminals 1100A to 1100K calculates information that indicates a degree of interference by which the base station of the adjacent cells is affected due to its transmission operation, and feedbacks the information to the base station. In this case, the information that is needed when the user combination is determined may be a total amount of interference by which the adjacent cells are affected due to the transmission operation of the terminal 1100A, which can be calculated by Math Figure 26.

MathFigure 26

$$\beta_{(m,k)}(w) = \|H_{(m,k)}^{I,up}w\|^2 \qquad [\text{Math.26}]$$

In this case, $\beta_{(m,k)}(w)$ denotes a total amount of interference by which adjacent cells are affected when the terminal 1100A uses w as a transmission beamforming vector. This value is calculated using Math Figure 26 on the basis of the interference channel information that is estimated by the channel information estimating unit 1110 and the transmission beamforming vector that is calculated by the transmission beamforming vector calculating unit 1120.

The information that is needed to determine a user combination and calculated by the feedback information calculating unit 1170 is transmitted to the base station 1200 through the feedback information transmitting unit 1180.

Hereinafter, a method will be described, in which the base station 1200 receives feedback information (that is, information that is needed to determine a user combination) transmitted from the terminals 1100A to 1100K and determines a user combination.

Referring to FIG. 10, the base station 1200 that is used in a radio transmitting and receiving system according to the present invention includes a high frequency processing unit 1210, an information restoring unit 1220, a channel estimating unit 1230, a user combination determining unit 1240, a feedback information receiving unit 1260, and a feedback information transmitting unit 1250.

The high frequency processing unit 1210 converts a received signal into a base band signal and transmits the base band signal to the information restoring unit 1220 and the channel estimating unit 1230.

The information restoring unit 1220 receives the base band signal transmitted form the high frequency processing unit 1210 and restores the received base band signal. At this time, the information restoring unit 1220 receives desired channel information and interference channel information that are estimated by the channel information estimating unit 1230 and restores the base band signal on the basis of the received information.

The channel estimating unit 1230 includes a desired channel information estimating unit 1230a and an interference signal information estimating unit 1230b. The channel estimating unit 1230 estimates desired channel information and interference signal information and outputs the estimated information to the user combination determining unit 1240.

The desired channel information estimating unit 1230 uses signals received from the terminals 1100A to 1100K within a corresponding cell to estimate desired channel information between the base station 1200 and the terminals 1100A to 1100K. At this time, the desired channel information indicates information on channels between the terminals 1100A to 1100K and the base station 1200.

The interference signal information estimating unit 1230b uses signals received from the terminals of the adjacent cells to estimate interference signal information that indicates information on interference by which the base station 1200 is affected due to the terminals of the adjacent cells.

The feedback information receiving unit 1260 receives feedback information transmitted from the terminals 1100A to 1100K (that is, information that is needed to determine a user combination) and transmits the received feedback information to the user combination determining unit 1240.

The user combination determining unit 1240 receives the desired channel information, the interference signal information, and the information needed to determine the user combination, and determines the user combination in consideration of not only performance of the corresponding cell but also an influence due to interference on adjacent cells and an influence due to interference from the adjacent cells, on the basis of the received information. In this case, the user combination is a group of terminals (users) selected by a base station among the terminals that desire to transmit data to the corresponding base station, and the selected users simultaneously transmit their data signals to the base station. At this time, in order to reduce the number of operations that are needed to determine the user combination, the user combination determining unit 1240 may repeatedly add each of the users to the user group and determine the user group as a user group that maximizes a data rate of the entire system. In this case, the data rate of the entire system can be calculated by a sum of the data rate of the cell to which the base station 1200 belongs and the data rate of cells adjacent to the cell to which the base station 1200 belongs. The data rate of the cells adjacent to the cell to which the base station 1200 belongs can be estimated on the basis of information of the cell to which the base station 1200 belongs and information of the total amount of interference by which the base stations of the adjacent cells are affected due to the transmission operation of the terminal of the corresponding cell.

The feedback information transmitting unit 1250 receives information of the user combination from the user combination determining unit 1240, and transmits the information to the terminals 1100A to 1100K.

Figure 11:
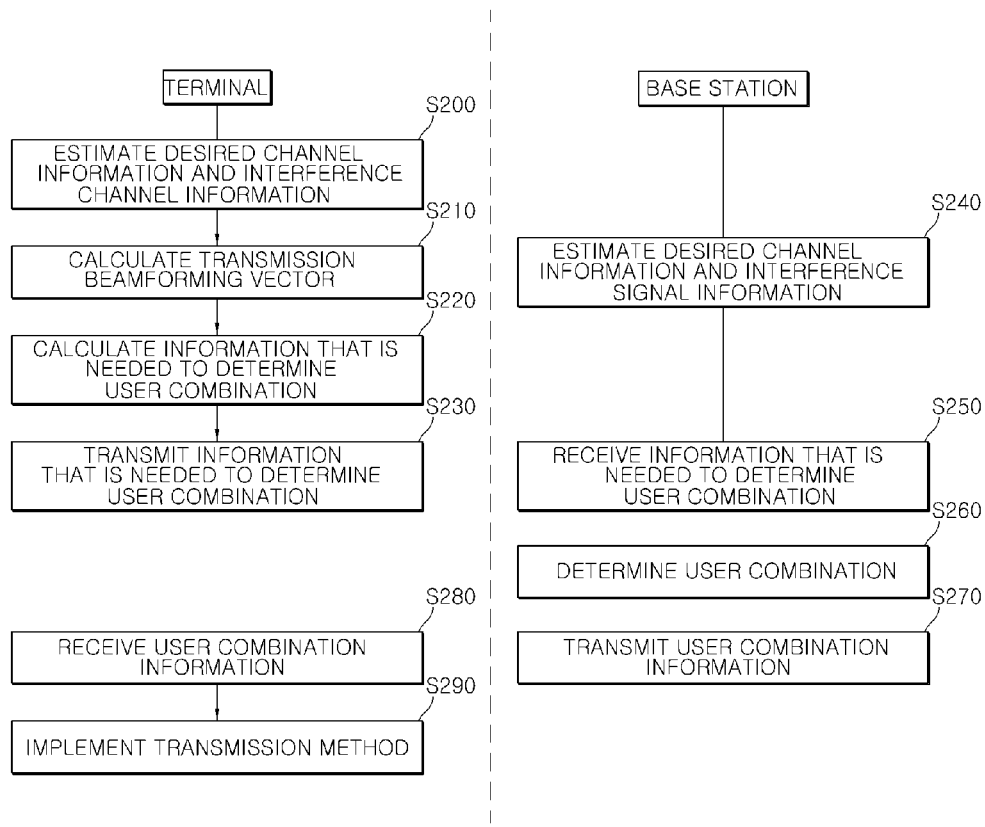
FIG. 11 is a block diagram illustrating a method in which K terminals, which have a plurality of antennas used for communication in a multi-user and multi-cell environment, transmit a data stream to a base station in consideration of not only performance of a corresponding cell but also an influence due to interference on adjacent cells and an influence due to interference from the adjacent cells.

FIG. 11 is a diagram illustrating a method in which K terminals, which have a plurality of antennas used for communication in a multi-cell environment, transmit data to a base station in consideration of not only performance of a corresponding cell but also an influence due to interference on adjacent cells and an influence due to interference from the adjacent cells.

The terminals 1100A to 1100K estimate use signals that are received from the base station 1200 of the corresponding cell and the base stations of the adjacent cells during a downlink to estimate desired channel information and interference channel information (S200). The terminals 1100A to 1100K calculate a transmission beamforming vector in consideration of not only performance of the corresponding cell but also an influence due to interference between the adjacent cells, on the basis of the estimated desired channel information and interference channel information (S210). The terminals 1100A to 1100K calculates information needed when the base station 1200 determines the user combination, on the basis of the estimated interference channel information and the calculated transmission beamforming vector, and transmits the calculated information to the base station 1200 (S220 and S230).

The base station 1200 uses signals received from the terminals 1100A to 1100K of the corresponding cell and the terminals of the adjacent cells during an uplink to estimate desired channel information and interference signal information (S240). The base station 1200 determines a user combination on the basis of the estimated desired channel information and interference signal information and feedback information (that is, information that is needed to determine the user combination) transmitted from the terminals 1100A to 1100K (S260). The base station 1200 transmits information on the determined user combination to the terminals 1100A to 1100K (S270). The terminals 1100A to 1100K receive the information on the user combination that is transmitted from the base station 1200 and implements a transmission method on the basis of the received information (S280 and S290). Accordingly, when the terminals transmit data, the data is transmitted in consideration of not only performance of the corresponding cell but also an influence due to interference on adjacent cells and an influence due to interference from the adjacent cells. Therefore, it is possible to increase a data rate of the entire system.

Figure 12:
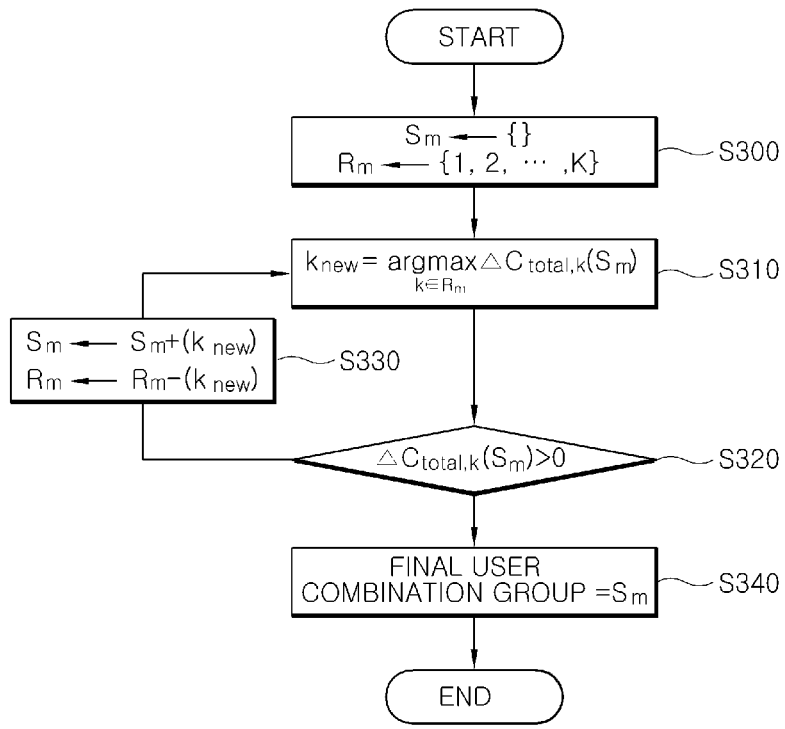
FIG. 12 is a diagram specifically illustrating a user combination determination algorithm in a base station according to an embodiment of the present invention.

FIG. 12 is a diagram specifically illustrating a user combination determination algorithm in a base station according to an embodiment of the present invention.

Referring to FIG. 12, $S_m$ denotes a selected user group and $R_m$ denotes a non-selected user group. During the first process as an initialization process, $S_m$ is defined as an empty set and $R_m$ is defined as a group of all users (S300).

When one user is added to the previously selected user group $S_m$, a variation ( $\Delta C_{total,k}(S_m)$ ) in the data rate of the entire system is calculated. This process is applied to all users that belong to the non-selected user group $R_m$, and a user that maximizes a variation in the data rate of the entire system is determined as $k_{new}$ (S310). A method of calculating the variation in the data rate of the entire system will be described in detail below.

It is determined whether the variation in the data rate of the entire system is larger than 0 when a user of $k_{new}$ is added to the previously selected user group $S_m$ (S320).

As the determined result, if the variation in the data rate of the entire system is larger than 0, the user of $k_{new}$ is added to the selected user group $S_m$, and is excluded from the non-selected user group $R_m$ (S330). If the variation in the data rate of the entire system is equal to or smaller than 0, $S_m$ is selected as a user group and a user combination is determined (S340).

Meanwhile, a method of calculating the variation ($\Delta C_{total,k}(S_m)$) in the data rate of the entire system is as follows.

$\Delta C_{total,k}(S_m)$ denotes a variation in the data rate of the entire system when the k-th user is added to the previously selected user combination $S_m$ in the m-th cell. The variation in the data rate of the entire system may be calculated as a sum of the variation in the data rate of the m-th cell and the variation in the data rate of the cells adjacent to the m-th cell. In this case, the variation in the data rate of the m-th cell can be calculated using information of the m-th cell, but it is not possible to know an accurate value of the variation in the data rate of the adjacent cells. In this invention, the variation in the data rate of the adjacent cells is estimated on the basis of information of the m-th cell and information that indicates the total amount of interference by which the base stations of the adjacent cells are affected due to the transmission operation of the terminal of the m-th cell.

(Multi-User Transmission Method that Determines a User Combination and a Transmission Beamforming Vector in Consideration of not only Performance of a Corresponding Cell but also an Influence Due to Interference on Adjacent Cells and an Influence Due to Interference from the Adjacent Cells During a Downlink)

First, it is assumed that the number of cells is M, K users exist in each of the cells, a terminal used by each of the users has Nu antennas, and a base station has Nb antennas. In this case, a signal that the k-th user of the m-th cell receives can be represented by Math Figure 27.

MathFigure 27

$$y_{(m,k)}^{down} = \sum_{k' \in S_m} H_{(m,m,k)}^{down} w_{(m,k')} x_{(m,k')} + \sum_{n \ne m} \sum_{k'' \in S_n} H_{(n,m,k)}^{down} w_{(n,k'')} x_{(n,k'')} + n_{(m,k)}$$ [Math. 27]

In this case, $S_m$ denotes a user combination that receives a data signal in the m-th cell, $H_{(n,m,k)}^{down}$ denotes a channel response matrix (Nu×Nu) between the base station of the n-th cell and the k-th terminal of the m-th cell, $w_{(m,k)}$ denotes a transmission beamforming vector (Nb×1) that is used when the base station of the m-th cell transmits a data signal to the k-th terminal of the m-th cell, $x_{(m,k)}$ denotes a data signal that the base station of the m-th cell transmits to the k-th terminal of the m-th cell, and $n_{(m,k)}$ denotes a reception noise vector (Nu×1) of the k-th user of the m-th cell.

The present invention includes contents that are related to a method in which each of the cells determines a user combination ($S_m$) and a method of determining a transmission beamforming vector ($w_{(m,k)}$) when is used when the base station transmits a data signal to terminals within the user combination. In particular, the present invention suggests a multi-user MIMO apparatus and a method thereof that can improve performance of the entire system in consideration of not only performance of a corresponding cell but also an influence due to interference between adjacent cells, when a user combination and a transmission beamforming vector are determined.

Figure 13:
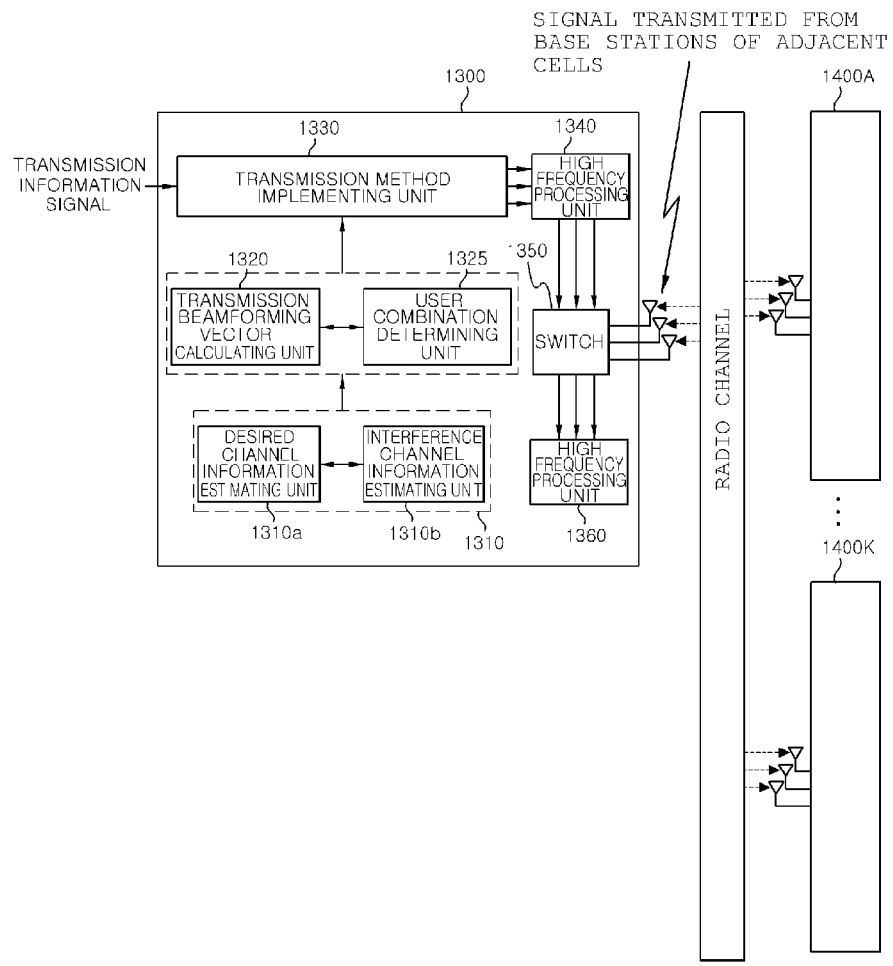
FIG. 13 is a block diagram illustrating a system in which a base station, which has a plurality of antennas used for communication in a multi-user and multi-cell environment, transmits a data stream to K terminals in consideration of not only performance of a corresponding cell but also an influence due to interference on adjacent cells.

FIG. 13 is a block diagram illustrating a system in which a base station, which has a plurality of antennas used for communication in a multi-cell environment, transmits a data stream to K terminals in consideration of not only performance of a corresponding cell but also an influence due to interference on adjacent cells and an influence due to interference from the adjacent cells.

FIG. 13 shows only one cell that includes one base station 1300 and a plurality of terminals 1400A to 1400K to allow the present invention to be clearly understood. As described above, a plurality of cells exist, and one base station 1300 and the plurality of terminals 1400A to 1400K exist in each of the cells, as shown in FIG. 13. That is, the configuration of FIG. 13 shows a multi-cell and multi-user environment.

Referring to FIG. 13, the base station 1300 that is used in a radio transmitting and receiving system according to the present invention includes a channel estimating unit 1310, a transmission beamforming vector calculating unit 1320, a user combination determining unit 1325, a transmission method implementing unit 1330, high frequency processing units 1340 and 1360, and a switch 1350.

The transmission method implementing unit 1330 receives information on a user combination and a transmission beamforming vector from the transmission beamforming vector calculating unit 1320 and the user combination determining unit 1325 and implements a transmission method of an information signal to be transmitted.

The high frequency processing unit 1340 transmits a high frequency signal received from the transmission method implementing unit 1330 into a base band signal and transmits the base band signal.

The switch 1350 receives a signal from a base station of a corresponding cell and base stations of adjacent cells through multiple antennas and transmits the high frequency signal to the high frequency processing unit 1360. The switch 1350 receives the base band signal that is transmitted from the high frequency processing unit 1340 and transmits the base band signal to the terminals 1400A to 1400K through multiple antennas.

The high frequency processing unit 1360 converts the signal received from the switch 1350 into a base band signal and transmits the base band signal to the channel estimating unit 1310.

The channel estimating unit 1310 includes a desired channel information estimating unit 1310a and an interference channel information estimating unit 1310b.

The desired channel information estimating unit 1310a uses a signal that is received from the terminals 1400A to 1400K of a corresponding cell to estimate desired channel information between the base station 1300 and the terminals 1400 to 1400. At this time, the desired channel information indicates information that is related to a channel between the base station 1300 and the terminals 1400A to 1400K. For example, in the base station of the m-th cell, the desired channel information may be a channel response matrix ($H_{(m,m,k)}^{down}$) between the base station of the m-th cell and the k-th terminal of the m-th cell.

The interference channel information estimating unit 1310b uses a signal received from terminals of cells adjacent to a corresponding cell to estimate interference channel information that indicates a degree of interference by which the terminals of the adjacent cells are affected due to a transmission operation of the base station 1300. The estimation method that estimates interference channel information in the interference channel information estimating unit 1320b will be described in detail below. The estimation method that will be described below is only exemplary and the present invention is not limited thereto. That is, various estimation methods may be used.

For example, the interference channel information in the m-th base station may be an individual channel response matrix ($H_{(m,n,k)}^{down}$) between the base station of the m-th cell and the terminals of the adjacent cells. However, when it is difficult to estimate an individual channel response matrix with respect to each of the terminals of the adjacent cells, a sum $$\sum_{n \neq m} \sum_{k'' \in S_n} (H_{(m,n,k'')}^{down})^H H_{(m,n,k'')}^{down}$$

of correction matrixes of channel response matrixes between the base station and the terminals in adjacent cells is estimated and may be used as interference channel information. In this case, an upper suffix H denotes Hermitian of a matrix. Actually, in the present invention, it is possible to use a sum of the correlation matrixes of the channel response matrixes between the base station and the terminals in adjacent cells instead of the individual channel response matrixes between the base station and the terminals in adjacent cells as interference channel information that is necessary when a transmission beamforming vector and a user combination are determined.

The channel estimating unit 1310 estimates desired channel information and interference channel information on the basis of signals, which are received from the terminals 1400A to 1400K of the corresponding cell and the terminals of the adjacent cells during an uplink.

When the uplink frequency and the downlink frequency are the same as in the TDD system, channel reciprocity between an uplink channel and a downlink channel is used. The channel reciprocity may be represented by Math Figure 17, when the uplink frequency and the downlink frequency are the same.

When the downlink frequency and the uplink frequency are different from each other as in the FDD system, Math Figure 17 is no longer realized. In this case, it is possible to estimate the desired channel information and the interference channel information using a correlation between a downlink channel response matrix and an uplink channel response matrix.

The transmission beamforming vector calculating unit 1320 calculates a transmission beamforming vector on the basis of the desired channel information and the interference channel information that are estimated by the channel estimating unit 1310, that is, in consideration of not only performance of a cell to which the base station 1300 belongs but also an influence due to interference between adjacent cells.

Hereinafter, a method will be described in which the transmission beamforming vector calculating unit 1120 calculates a transmission beamforming vector. As specific examples, a non-interference transmission beamforming scheme, a maximum SGINR transmission beamforming scheme, and a SGINR transmission beamforming scheme including a cell loading factor of adjacent cells will be described. In this case, an important thing is that an influence due to interference on the other terminals except for a corresponding terminal in a corresponding cell is considered when a base station calculates a transmission beamforming vector during a downlink.

First Embodiment

Non-Interference Transmission Beamforming Scheme

The non-interference transmission beamforming scheme is a transmission beamforming scheme that maximizes a data rate with respect to the k-th terminal under the condition where the base station 1300 does not interfere with the other terminals except for the k-th terminal in the corresponding cell and the terminals of the adjacent cells, when it is assumed that the base station 1300 transmits a data signal to the k-th terminal in the corresponding cell. In the non-interference transmission beamforming method, a transmission beamforming vector that is used when a data signal is transmitted to the k-th terminal of the m-th cell can be represented by Math Figure 28.

MathFigure 28

$$w_{(m,k)}^1 = \underset{w}{\operatorname{argmax}} |h_{eff(m,m,k)}^{down} w| \qquad [\text{Math. 28}]$$

subject to $h_{eff(m,m,k')}^{down} w = 0$ for all $k'$ ($k' \in S_m$ and $k' \neq k$), $h_{eff(m,n,k'')}^{down} w = 0$ for all $n$ and $k''$ ($n \neq m$ and $k'' \in S_n$)

In this case, $h_{eff(m,n,k)}^{down}$ denotes an effective channel vector (1×Nb) that is obtained by multiplying a reception vector of the k-th terminal of the n-th cell and a channel response matrix between the base station of the m-th cell and the k-th terminal of the n-th cell. Thus, in Math Figure 28, a first conditional expression means that interference does not affect the other terminals except for the k-th terminal in the corresponding cell, and a second conditional expression means that interference does not affect the terminals in the adjacent cells.

A process of calculating a transmission beamforming vector in the non-interference transmission beamforming scheme is as follows. First, an effective non-interference matrix is calculated using Math Figure 29 on the basis of the desired channel information and the interference channel information that are estimated by the channel estimating unit 1310.

MathFigure 29

$$H_{\text{eff}(m,k)}^{ZF} = \begin{bmatrix} h_{\text{eff}(m,m,k)}^{down} \\ h_{\text{eff}(m,m,k')}^{down} \\ \ldots \\ h_{\text{eff}(m,n,k'')}^{down} \\ \ldots \end{bmatrix} \begin{array}{l} \leftarrow k' \in S_m \text{ and } k' \neq k \\ \\ \leftarrow n \neq m \text{ and } k'' \in S_n \end{array} \quad [\text{Math. 29}]$$

In this case,
$\text{H}_{\text{eff}(m,k)}^{ZF}$
means an effective non-interference matrix with respect to the k-th user of the m-th cell. The first row vector of the effective non-interference matrix is composed of an effective channel vector between the base station of the m-th cell and the k-th user of the m-th cell, and the other row vectors are composed of effective channel vectors between the base station of the m-th cell and the other users of the m-th cell and the users of the adjacent cells. After the effective non-interference matrix is calculated using Math Figure 29, a first column vector of the calculated inverse matrix is used as a transmission beamforming vector.

Second Embodiment

Maximum SGINR Transmission Beamforming Scheme

The maximum SGINR transmission beamforming scheme is a transmission beamforming scheme that can improve performance of all cells in consideration of performance of the corresponding cell and an influence due to interference on adjacent cells. In order to describe the maximum SGINR transmission beamforming scheme, first, the SGINR is defined. When the base station of the m-th cell uses a transmission beamforming vector
w
to transmit a data signal to the k-th terminal, the SGINR is defined by Math Figure 30.

MathFigure 30

$$\Gamma_{(m,k)}^{down}(w) = \frac{\|H_{(m,m,k)}^{down}w\|^2}{\sum_{\substack{k' \in S_m \\ k' \neq k}} \|H_{(m,m,k')}^{down}w\|^2 + \sum_{n \neq m}\sum_{k'' \in S_n} \|H_{(m,n,k'')}^{down}w\|^2 + \sigma_N^2} \quad [\text{Math. 30}]$$

In this case,
$\sigma_N^2$
denotes power of noise. Thus, a numerator of the SGINR denotes signal power of the corresponding terminal, and a denominator thereof denotes a sum of power of interference and power of noise that affect the other terminals in the same cell and the terminals of the adjacent cells.

In the maximum SGINR transmission beamforming scheme, a vector that maximizes the SGINR is used as a transmission beamforming vector. In this case, a transmission beamforming vector that is used when the m-th base station transmits a data signal to the k-th user can be represented by Math Figure 31.

MathFigure 31

$$w_{(m,k)}^2 = \operatorname*{argmax}_w \Gamma_{(m,k)}^{down}(w) \text{ subject to } \|w\|^2 = 1 \quad [\text{Math. 31}]$$

In order to solve this problem, a SGINR matrix is defined by Math Figure 32.

MathFigure 32

$$K_{(m,k)}^{down} = \left( \sum_{\substack{k' \in S_m \\ k' \neq k}} H_{(m,m,k')}^{down\ H} H_{(m,m,k')}^{down} + \sum_{n \neq m}\sum_{k'' \in S_n} H_{(m,n,k'')}^{down\ H} H_{(m,n,k'')}^{down} + \sigma_N^2 I_{Nu} \right)^{-1} \\ (H_{(m,m,k)}^{down\ H} H_{(m,m,k)}^{down}) \quad [\text{Math. 32}]$$

A process of calculating a transmission beamforming vector in the maximum SGINR transmission beamforming scheme is as follows. First, the SGINR matrix (
$\text{K}_{(m,k)}^{down}$
) is calculated on the basis of the desired channel information and the interference channel information that are estimated by the channel estimating unit 1310, and an eigen-vector that corresponds to the largest eigen-value of the SGINR matrix is calculated and used as a transmission beamforming vector.

Third Embodiment

Maximum SGINR Transmission Beamforming Scheme Including a Cell Loading Factor of Adjacent Cells The SGINR matrix including a cell loading factor of the adjacent cells is defined by Math Figure 33.

MathFigure 33

$$\Gamma_{(m,k)}^{down,\alpha}(w) = \frac{\|H_{(m,m,k)}^{down}w\|^2}{\sum_{\substack{k' \in S_m \\ k' \neq k}} \|H_{(m,m,k')}^{down}w\|^2 + \alpha\sum_{n \neq m}\sum_{k'' \in S_n} \|H_{(m,n,k'')}^{down}w\|^2 + \sigma_N^2} \quad [\text{Math. 33}]$$

In this case,
α
denotes a cell loading factor of the adjacent cells. In the maximum SGINR transmission beamforming scheme including the cell loading factor of the adjacent cells, a vector that maximizes the SGINR including the cell loading facto of the adjacent cells is used as a transmission beamforming vector. In this case, a transmission beamforming vector that is used when the base station of the m-th cell transmits a data signal to the k-th terminal can be represented by Math Figure 34.

MathFigure 34

$$w_{(m,k)}^3 = \underset{w}{\operatorname{argmax}} \Gamma_{(m,k)}^{down,\alpha}(w) \text{ subject to } \|w\|^2 = 1 \quad \text{[Math. 34]}$$

In order to solve this problem, the SGINR matrix including the cell loading factor of the adjacent cells is defined by Math Figure 35.

MathFigure 35

$$K_{(m,k)}^{down,\alpha} = \left( \sum_{\substack{k' \in S_m \\ k' \neq k}} H_{(m,m,k')}^{down}{}^H H_{(m,m,k')}^{down} + \right.$$

$$\left. \alpha \sum_{n \neq m} \sum_{k'' \in S_n} H_{(m,n,k'')}^{down}{}^H H_{(m,n,k'')}^{down} + \sigma_N^2 I_{N_u} \right)^{-1} (H_{(m,m,k)}^{down}$$

$$^H H_{(m,m,k)}^{down}) \quad \text{[Math. 35]}$$

A process of calculating a transmission beamforming vector in the maximum SGINR transmission beamforming scheme including a cell loading factor of the adjacent cells is as follows. First, the SGINR matrix ($K_{(m,k)}^{down}$) including the cell loading factor of the adjacent cells is calculated on the basis of the desired channel information and the interference channel information that are estimated by the channel estimating unit 1310, and an eigen-vector that corresponds to the largest eigen-value of the SGINR matrix including the cell loading factor of the adjacent cells is calculated and used as a transmission beamforming vector.

The user combination determining unit 1325 receives the desired channel information and the interference channel information that are estimated by the channel estimating unit 1320 and determines a user combination in consideration of not only performance of a corresponding cell but also an influence due to interference on adjacent cells from the base station (that is, an influence of interference by which the terminals of the adjacent cells are affected due to a transmission operation of the base station), on the basis of the received information. At this time, in order to reduce the number of operations that are needed to determine the user combination, the user combination determining unit 1325 may repeatedly add each of the users (terminals) to the user group and determine the user group as a terminal group that maximizes a data rate of the entire system.

Meanwhile, when the user combination determining unit 1325 considers an influence due to interference on adjacent cells, it is possible to additionally apply a cell loading factor of the adjacent cells.

FIG. 14 is a diagram illustrating a method in which a base station, which has a plurality of antennas used for communication in a multi-cell environment, transmits data to K terminals in consideration of not only performance of a corresponding cell but also an influence due to interference on adjacent cells.

A base station 1300 uses signals that are received from terminals 1400 to 1400K of a corresponding cell and terminals of adjacent cells during an uplink to estimate desired channel information and interference channel information (S400). The base station 1300 determines a transmission beamforming vector and a user combination in consideration of performance of a corresponding cell and an influence due to interference on adjacent cells, on the basis of the estimated desired channel information and interference channel information (S410 and S420). In addition, the base station 1300 implements a transmission method on the basis of information that is related to a transmission beamforming vector and a user combination (S420). According to the present invention, when the base station transmits data, the base station transmits the data in consideration of performance of a corresponding cell and an influence due to interference on adjacent cells. Accordingly, it is possible to increase a data rate of the entire system.

The optimal embodiments have been disclosed in the specification and the accompanying drawings. The specific terms have been used herein, but it should be understood that the specific terms are used to describe the present invention, not to limit the scope of the present invention disclosed in the appended claims. Accordingly, it will be apparent to those who skilled in the art that various modifications and changes may be made thereto. Therefore, the scope of the present invention should be defined by the appended claims.

The invention claimed is:

1. A radio transmitting and receiving apparatus that has a plurality of antennas used for communication in a multi-user and multi-cell environment, comprising:
   a channel information estimating unit that uses a signal received from a first base station of a cell to which the radio transmitting and receiving apparatus belongs to estimate desired channel information between the radio transmitting and receiving apparatus and the first base station, and uses a signal received from a second base station of a cell adjacent to the cell to which the radio transmitting and receiving apparatus belongs to estimate interference channel information, which indicates a degree of interference by which the second base station is affected due to a transmission operation of the radio transmitting and receiving apparatus; and
   a transmission method implementing unit that implements a transmission method of a radio signal to be transmitted, on the basis of the estimated desired channel information and interference channel information,
   wherein the transmission method implementing unit includes:
   a stream number determining unit that determines the number of streams simultaneously transmitted, on the basis of the desired channel information and the interference channel information;
   a stream multiplexing unit that divides a transmission information signal into a plurality of streams; and
   a transmission beamforming matrix calculating unit that calculates a transmission beamforming matrix on the basis of the desired channel information and the interference channel information.

2. The radio transmitting and receiving apparatus of claim 1,
   wherein the channel information estimating unit uses channel reciprocity between a downlink channel response matrix, which is transmitted from the second base station to the radio transmitting and receiving apparatus, and an uplink channel response matrix, which is transmitted from the radio transmitting and receiving apparatus to the second base station, to estimate the interference channel information.

3. The radio transmitting and receiving apparatus of claim 1,
   wherein the transmission method implementing unit includes a transmission beamforming vector calculating unit that calculates a transmission beamforming weight vector on the basis of the desired channel information and the interference channel information.

4. The radio transmitting and receiving apparatus of claim 3, wherein the transmission beamforming vector calculating unit calculates a SGINR matrix on the basis of the desired channel information and the interference channel information, and calculates an eigen-vector that corresponds to the largest eigen-value of the SGINR matrix to derive the transmission beamforming weight vector.

5. The radio transmitting and receiving apparatus of claim 1, wherein the stream number determining unit calculates SGINR for each stream on the basis of the desired channel information and the interference channel information, and determines the number of streams that are simultaneously transmitted through a water-filling algorithm on the basis of the calculated SGINR.

6. The radio transmitting and receiving apparatus of claim 1, wherein the transmission beamforming matrix calculating unit calculates a SGINR matrix on the basis of the desired channel information and the interference channel information, calculates eigen-vectors of the SGINR matrix, and calculates a transmission beamforming matrix on the basis of the calculated eigen-vectors.

7. The radio transmitting and receiving apparatus of claim 1, wherein the transmission method implementing unit implements a transmission method while limiting a total amount of interference on adjacent cells to a maximum interference permissible amount or less on the basis of the desired channel information and the interference channel information.

8. A radio transmitting and receiving apparatus that has a plurality of antennas used for communication in a multi-user and multi-cell environment, comprising:
   a channel information estimating unit that uses a signal received from a first base station of a cell to which the radio transmitting and receiving apparatus belongs to estimate desired channel information between the radio transmitting and receiving apparatus and the first base station, and uses a signal received from a second base station of a cell adjacent to the cell to which the radio transmitting and receiving apparatus belongs to estimate interference channel information, which indicates a degree of interference by which the second base station is affected due to a transmission operation of the radio transmitting and receiving apparatus;
   a transmission beamforming vector calculating unit that calculates a transmission beamforming vector, on the basis of the estimated desired channel information and interference channel information;
   a feedback information calculating unit that calculates information needed when the first base station determines a user combination, on the basis of the calculated transmission beamforming vector and the estimated desired channel information;
   a feedback information transmitting unit that receives the information calculated by the feedback information calculating unit and transmits the information to the first base station; and
   a feedback information receiving unit that receives information on the user combination determined by the first base station
   wherein the transmission beamforming vector calculating unit calculates a transmission beamforming weight vector on the basis of the desired channel information and the interference channel information, and
   wherein the transmission beamforming vector calculating unit calculates a SGINR matrix on the basis of the desired channel information and the interference channel information, and calculates the transmission beamforming vector on the basis of an eigen-vector that corresponds to the largest eigen-value of the SGINR matrix.

9. The radio transmitting and receiving apparatus of claim 8, wherein the transmission beamforming vector calculating unit calculates the transmission beamforming vector in consideration of link performance of the cell to which the radio transmitting and receiving apparatus belongs and interference by which the second base station is affected due to the radio transmitting and receiving apparatus, on the basis of the desired channel information and the interference channel information.

10. The radio transmitting and receiving apparatus of claim 8, wherein the transmission beamforming vector calculating unit calculates a SGINR matrix including a cell loading factor of an adjacent cell on the basis of the desired channel information and the interference channel information, and calculates the transmission beamforming vector on the basis of an eigen-vector that corresponds to the largest eigen-value of the SGINR matrix including the cell loading factor of the adjacent cell.

11. The radio transmitting and receiving apparatus of claim 8, wherein the information that is needed to determine the user combination is information that indicates a degree of interference by which the second base station is affected due to a transmission operation of the radio transmitting and receiving apparatus.

12. A radio signal transmission method in which a radio transmitting and receiving apparatus having a plurality of antennas used for communication in a multi-user and multi-cell environment transmits a radio signal to a first terminal of a corresponding cell, comprising:
   a first step of allowing the radio transmitting and receiving apparatus to use a signal received from the first terminal and a second terminal of an adjacent cell during an uplink so as to estimate desired channel information and interference channel information;
   a second step of allowing the radio transmitting and receiving apparatus to calculate a transmission beamforming vector and determine a user combination in consideration of performance of a cell to which the radio transmitting and receiving apparatus belongs and an influence due to interference on the second terminal from the radio transmitting and receiving apparatus, on the basis of the desired channel information and the interference channel information; and
   a third step of allowing the radio transmitting and receiving apparatus to implement a transmission method on the basis of the calculated transmission beamforming vector and the determined user combination
   wherein the second step includes:
   a step of calculating a transmission beamforming weight vector on the basis of the desired channel information and the interference channel information;
   a step of calculating the SGINR matrix on a basis of the desired channel information and the interference channel information; and a step of calculating the transmission beamforming vector on the basis of an eigen-vector that corresponds to the largest eigen-value of the SGINR matrix.

13. The radio signal transmission method of claim 12, wherein the second step calculates the transmission beamforming vector in consideration of performance of the cell to which the radio transmitting and receiving apparatus belongs and an influence due to interference on the second terminal from the radio transmitting and receiving apparatus, on the basis of the desired channel information and the interference channel information.

14. The radio signal transmission method of claim 12, wherein the second step includes:
a step of calculating an effective non-interference matrix on the basis of the desired channel information and the interference channel information; and
a step of calculating the transmission beamforming vector on the basis of a first column vector of an inverse matrix of the effective non-interference matrix.

15. The radio signal transmission method of claim 12, wherein the second step determines the user combination in consideration of performance of the cell to which the radio transmitting and receiving apparatus belongs and an influence due to interference on the second terminal from the radio transmitting and receiving apparatus, on the basis of the desired channel information and the interference channel information.

\* \* \* \* \*